(12) United States Patent
Yamaguchi

(10) Patent No.: US 12,197,221 B2
(45) Date of Patent: Jan. 14, 2025

(54) INFORMATION PROCESSING APPARATUS AND INFORMATION PROCESSING METHOD

(71) Applicant: SONY GROUP CORPORATION, Tokyo (JP)

(72) Inventor: Takamori Yamaguchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 288 days.

(21) Appl. No.: 17/629,634

(22) PCT Filed: Jul. 7, 2020

(86) PCT No.: PCT/JP2020/026610
§ 371 (c)(1),
(2) Date: Jan. 24, 2022

(87) PCT Pub. No.: WO2021/024683
PCT Pub. Date: Feb. 11, 2021

(65) Prior Publication Data
US 2022/0397904 A1    Dec. 15, 2022

(30) Foreign Application Priority Data
Aug. 5, 2019   (JP) ................... 2019-143653

(51) Int. Cl.
*G05D 1/00* (2024.01)
*B25J 13/08* (2006.01)
*G01C 21/34* (2006.01)

(52) U.S. Cl.
CPC .......... *G05D 1/0214* (2013.01); *B25J 13/081* (2013.01); *G01C 21/3415* (2013.01); *G05D 1/0088* (2013.01); *G05D 1/0227* (2013.01)

(58) Field of Classification Search
CPC .. G05D 1/0214; G05D 1/0088; G05D 1/0227; G05D 1/0238; B25J 13/081; G01C 21/3415
See application file for complete search history.

(56) References Cited

U.S. PATENT DOCUMENTS 9,116,521 B2    8/2015 Ueda et al.
2014/0148989 A1*  5/2014 Ueda .................. G05D 1/02
                                              701/23

(Continued)

FOREIGN PATENT DOCUMENTS

DE    112011105449 T5    4/2014
JP    2010-143349 A      7/2010

(Continued)

OTHER PUBLICATIONS

Schiller, William; Donath, Max. (1997). The Virtual Bumper: A Control Based Collision Avoidance System For Highway Vehicles. Minnesota Department of Transportation. Retrieved from the University of Minnesota Digital Conservancy, https://hdl.handle.net/11299/155120. (Year: 1997).*

(Continued)

*Primary Examiner* — Jess Whittington
*Assistant Examiner* — Brian E Yang
(74) *Attorney, Agent, or Firm* — CHIP LAW GROUP

(57) ABSTRACT

A device and a method for performing control to change a flexible virtual bumper for maintaining a space between a mobile object and an obstacle to be equal to or larger than a predetermined distance are enabled. A data processing unit that executes control to change the flexible virtual bumper for maintaining the space between the mobile object and the obstacle to be equal to or larger than the predetermined distance, and a drive unit that drives the mobile object in such a way that no obstacle enters the flexible virtual bumper are included. The data processing unit executes control to (Continued)

change the flexible virtual bumper at least either in size or shape. For each one of a plurality of travel route candidates for the mobile object, the data processing unit executes a simulation of changing the bumper size in such a way that no obstacle enters the flexible virtual bumper, and selects a safe travel route.

17 Claims, 20 Drawing Sheets

(56) References Cited

U.S. PATENT DOCUMENTS

| | | | |
|---|---|---|---|
| 2022/0176958 A1* | 6/2022 | Stanchev | B60W 30/16 |
| 2023/0182300 A1* | 6/2023 | Meduna | B25J 9/1666 |
| | | | 700/255 |

FOREIGN PATENT DOCUMENTS

| | | | |
|---|---|---|---|
| JP | 2013077265 A | * | 4/2013 |
| JP | 2014-211759 A | | 11/2014 |
| JP | 5746347 B2 | | 7/2015 |
| KR | 10-2014-0039275 A | | 4/2014 |
| WO | 2013/011543 A1 | | 1/2013 |

OTHER PUBLICATIONS

Schiller, Bill & Morellas, Vassilios & Donath, M.. (1998). Collision Avoidance for Highway Vehicles Using the Virtual Bumper Controller. (Year: 1998).*

O. Khatib, "Real-time obstacle avoidance for manipulators and mobile robots," Proceedings. 1985 IEEE International Conference on Robotics and Automation, St. Louis, MO, USA, 1985, pp. 500-505, doi: 10.1109/ROBOT.1985.1087247. keywords: {Manipulators; Mobile robots; Large Hadron Collider; Laboratories}, (Year: 1985).*

Gorjestani, Alec; Donath, Max; Alexander, Lee. (1999). Radar Based Longitudinal Virtual Bumper Collision Avoidance System Implemented on a Truck. Minnesota Department of Transportation. Retrieved from the University of Minnesota Digital Conservancy, https://hdl.handle.net/11299/152991. (Year: 1999).*

International Search Report and Written Opinion of PCT Application No. PCT/JP2020/026610, issued on Sep. 29, 2020, 09 pages of ISRWO.

* cited by examiner

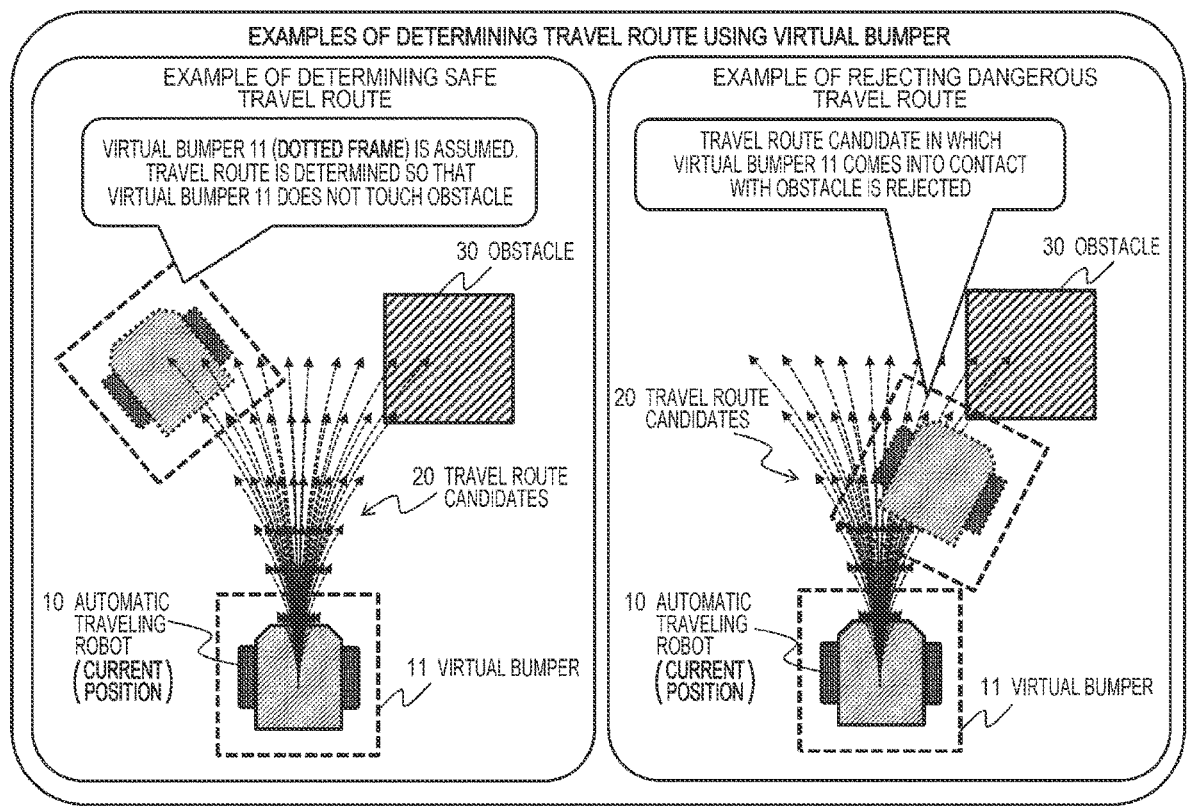

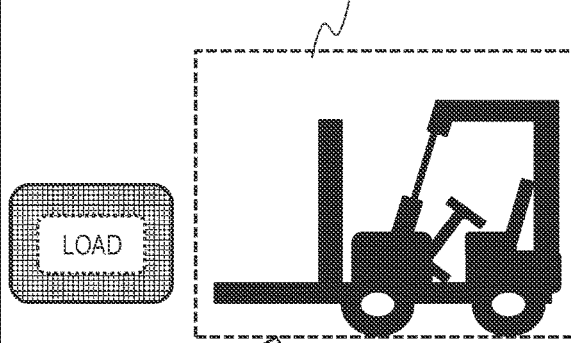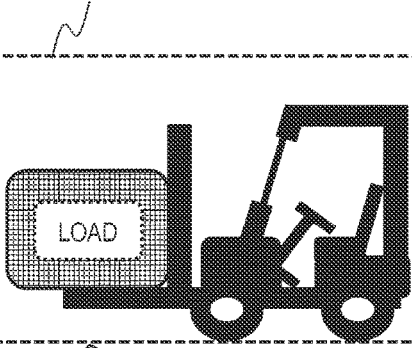

FIG. 7A FLEXIBLE VIRTUAL BUMPER SETTING EXAMPLE 1

111a FLEXIBLE VIRTUAL BUMPER (WITHOUT CARRIED LOAD)

WHEN CARGO IS LOADED, BUMPER IS DEFORMED SO AS NOT TO COME INTO CONTACT WITH CARGO (TO PREVENT BEING STUCK DUE TO DETERMINATION THAT COLLISION WITH CARGO HAS OCCURRED)

FIG. 7B FLEXIBLE VIRTUAL BUMPER SETTING EXAMPLE 2

111b FLEXIBLE VIRTUAL BUMPER (WITH CARRIED LOAD)

AT TIME OF MOVING WITH CARRIED CARGO, BUMPER IS DEFORMED SO AS TO INCLUDE CARGO (TO PREVENT CARGO FROM COLLIDING WITH OBSTACLE)

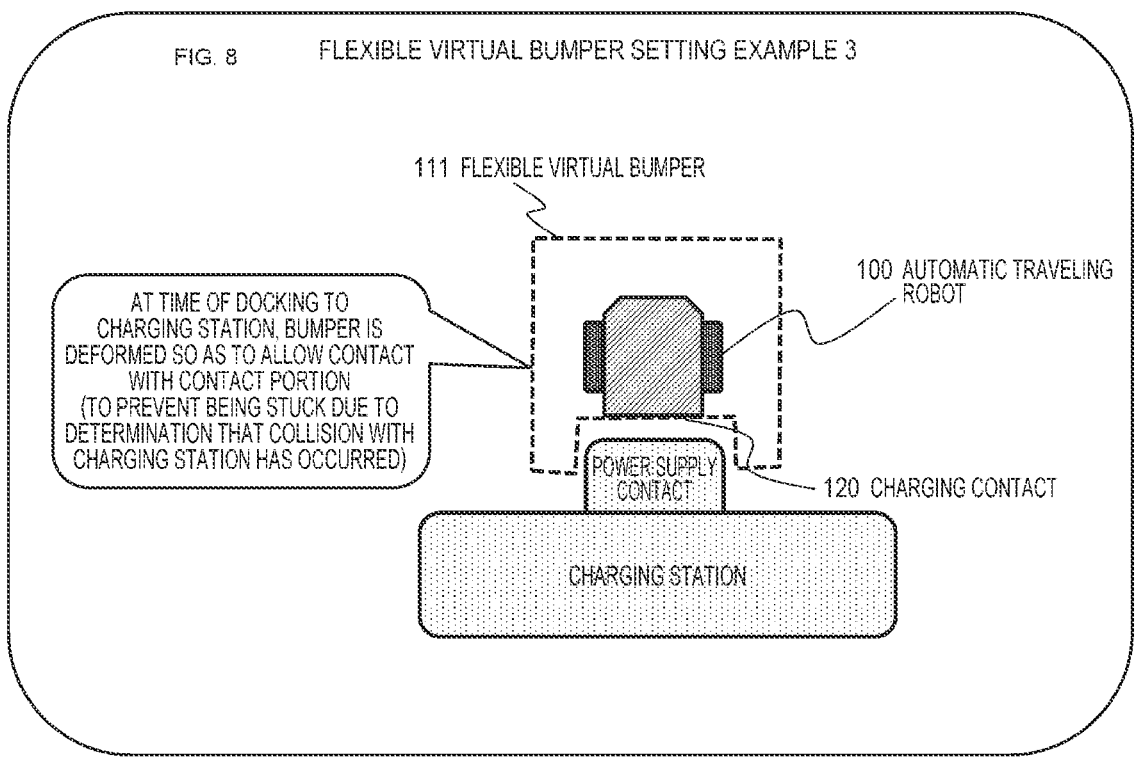

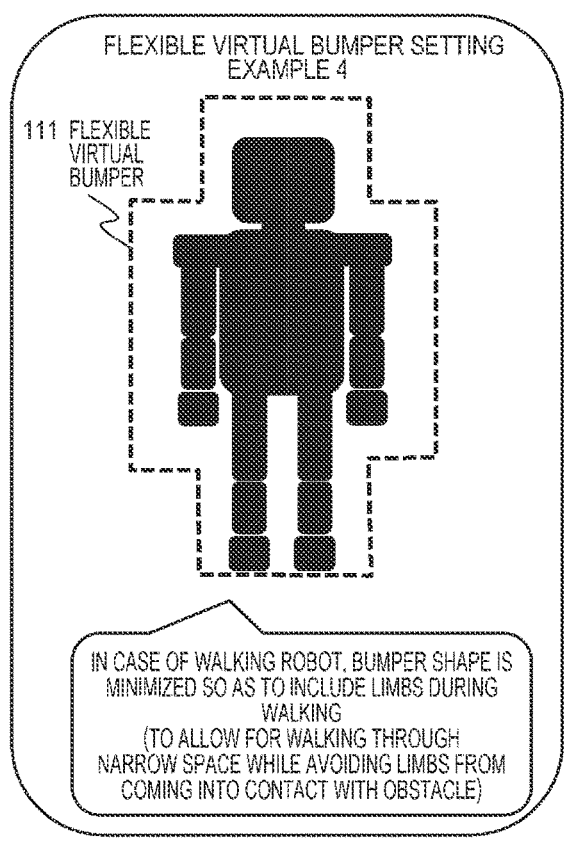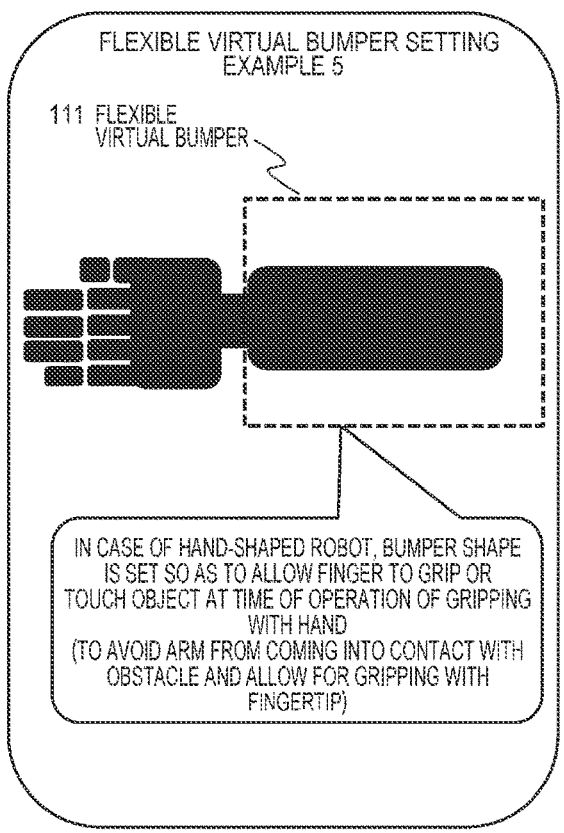

FIG. 17

| | (a) RAVEL ROUTE CANDIDATES | (b) DATA ABOUT TRANSITION OF BUMPER SIZE IN ACCORDANCE WITH DISTANCE | (c) AVERAGE VALUE OF BUMPER SIZE (SIZE RATIO (INITIAL VALUE =1.0)) | (d) MINIMUM VALUE OF BUMPER SIZE (SIZE RATIO (INITIAL VALUE =1.0)) | (e) VALID or REJECTED (VALID IN CASE WHERE MINIMUM VALUE ≥ MINIMUM ALLOWABLE SIZE HOLDS) | (f) BUMPER SHAPE | (g) ROUTE TRAVEL DISTANCE (m) |
|---|---|---|---|---|---|---|---|
| (1) | ROUTE 1 |  | 1.0 | 0.8 | VALID | RECTANGULAR | 32.0 |
| (2) | ROUTE 2 |  | 0.9 | 0.7 | VALID | RECTANGULAR | 30.1 |
| (3) | ROUTE 3 |  | 0.8 | 0.5 | REJECTED | RECTANGULAR | 29.1 |
| .. | .. | | .. | .. | .. | .. | .. |
| (11) | ROUTE 11 |  | 0.75 | 0.8 | VALID | RECTANGULAR | 28.5 |
| (12) | ROUTE 12 |  | 0.65 | 0.55 | REJECTED | RECTANGULAR | 32.5 |
| .. | .. | | .. | .. | .. | .. | .. |

MINIMUM ALLOWABLE SIZE OF BUMPER SIZE = 0.6
(SIZE RATIO (DEFINED NORMAL SIZE (INITIAL VALUE) = 1.0))

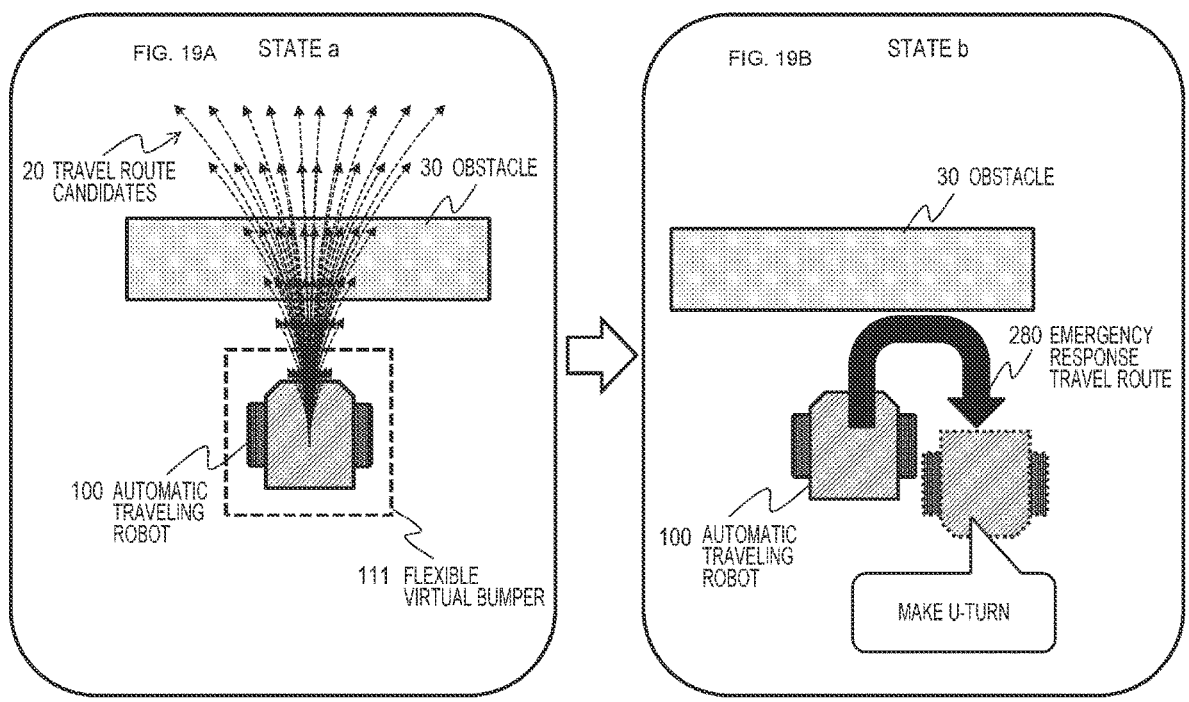

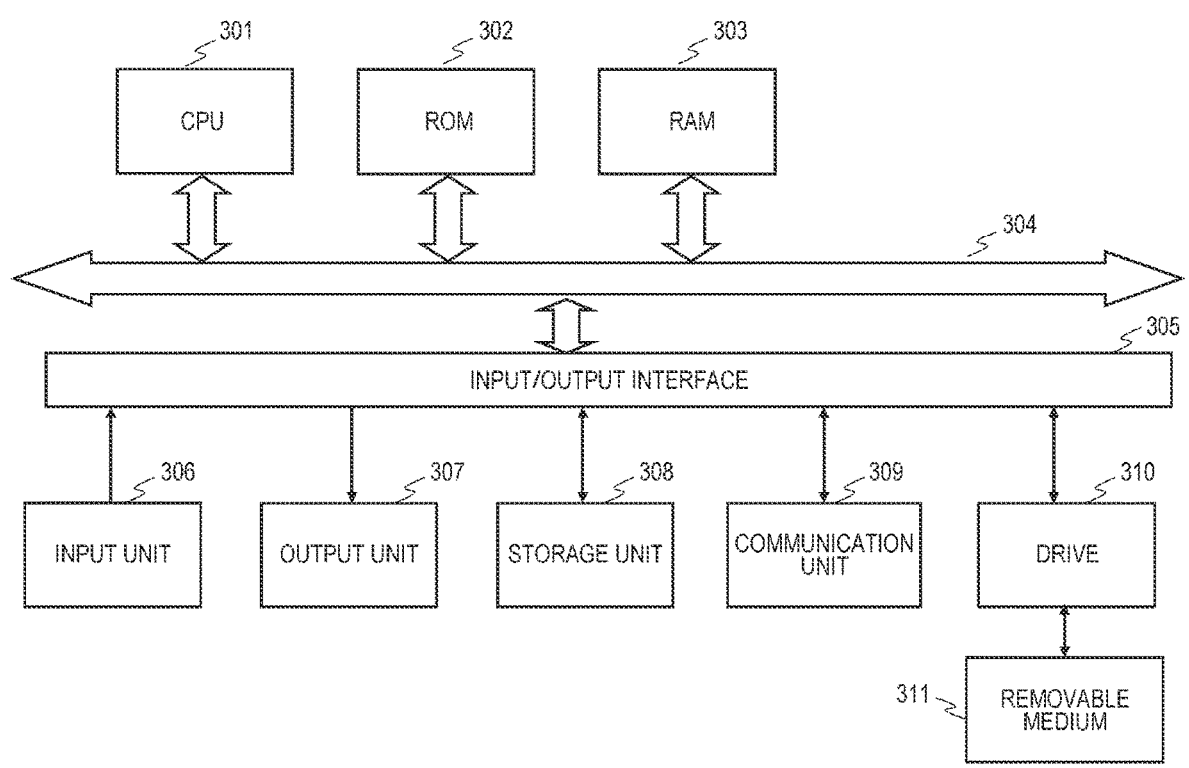

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/026610 filed on Jul. 7, 2020, which claims priority benefit of Japanese Patent Application No. JP 2019-143653 filed in the Japan Patent Office on Aug. 5, 2019. Each of the above-referenced applications is hereby incorporated herein by reference in its entirety.

TECHNICAL FIELD

The present disclosure relates to an information processing apparatus, an information processing method, and a program. More specifically, the present disclosure relates to an information processing apparatus, an information processing method, and a program that enable safe travel of an automatic traveling robot or an automatic traveling vehicle.

BACKGROUND ART

In recent years, development and use of automatic traveling type robots and automatic traveling type vehicles have been rapidly advanced. For example, development and use of a robot that travels in an unmanned manner carrying a load in a warehouse or an office, an autonomous driving vehicle that travels on a road, and the like have been advanced.

The automatic traveling type robots and the automatic traveling type vehicles are required to travel safely while avoiding collision with other robots, vehicles, pedestrians, and the like.

Note that examples of conventional technologies that disclose a technology for safe traveling of an automatic traveling robot include, for example, Patent Document 1 (Japanese Patent Application Laid-Open No. 2014-211759).

This document discloses a configuration in which an evaluation value based on a distance from an obstacle or the like is calculated from a plurality of paths, and a path for safe travel is determined in accordance with the calculated evaluation value.

However, most of the conventional technologies disclosed so far, including this disclosure document, perform processing of determining a safe traveling route after fixing a minimum allowable separation distance between an own device and an obstacle.

Thus, for example, even in a case of a passage wider than the actual width of the own device, if a space between the own device and an obstacle such as a wall does not fall within a predefined allowable space, the passage is determined to be impassable by the processing.

Such processing has a problem in that a travelable region and route of the automatic traveling type robot is limited.

CITATION LIST

Patent Document

Patent Document 1: Japanese Patent Application Laid-Open No. 2014-211759

SUMMARY OF THE INVENTION

Problems to be Solved by the Invention

The present disclosure has been made in view of the above problem, for example, and is aimed at providing an information processing apparatus, an information processing method, and a program that increases travelable regions and routes and enables safe travel by changing a separation distance between an own device and an obstacle in accordance with a situation without fixing the separation distance.

Solutions to Problems

A first aspect of the present disclosure provides
an information processing apparatus including:
a data processing unit that executes control to change a flexible virtual bumper for maintaining a space between a mobile object and an obstacle to be equal to or larger than a predetermined distance; and
a drive unit that drives the mobile object in such a way that no obstacle enters the flexible virtual bumper,
in which the data processing unit executes control to change the flexible virtual bumper at least either in size or shape.

Moreover, a second aspect of the present disclosure provides
an information processing method to be executed by an information processing apparatus, the method including:
a bumper control step of executing, by a data processing unit, control to change a flexible virtual bumper for maintaining a space between a mobile object and an obstacle to be equal to or larger than a predetermined distance; and
a driving step of driving, by a drive unit, the mobile object in such a way that no obstacle enters the flexible virtual bumper,
in which the bumper control step includes the data processing unit executing control to change the flexible virtual bumper at least either in size or shape.

Moreover, a third aspect of the present disclosure provides
a program for causing an information processing apparatus to execute information processing, the program causing:
a data processing unit to execute a bumper control step of controlling to change a flexible virtual bumper for maintaining a space between a mobile object and an obstacle to be equal to or larger than a predetermined distance; and
a drive unit to execute a driving step of driving the mobile object in such a way that no obstacle enters the flexible virtual bumper,
in which the bumper control step includes causing the data processing unit to execute control to change the flexible virtual bumper at least either in size or shape.

Note that the program of the present disclosure can be, for example, provided by a storage medium or a communication medium provided in a computer-readable format to an information processing apparatus, an image processing apparatus, or a computer system capable of executing a variety of program codes. Providing such a program in a computer-readable format enables implementation of processing on the information processing apparatus or the computer system in accordance with the program.

Other objects, features, and advantages of the present disclosure will become apparent from the detailed description based on the embodiment of the present disclosure and the accompanying drawings described later. Note that, in the present specification, a system is a logical set configuration of a plurality of devices, and is not limited to one in which each configuration device is in the same housing.

According to a configuration of the embodiment of the present disclosure, a device and a method for performing control to change a flexible virtual bumper for maintaining a space between a mobile object and an obstacle to be equal to or larger than a predetermined distance are enabled.

Specifically, for example, a data processing unit that executes control to change the flexible virtual bumper for maintaining the space between the mobile object and the obstacle to be equal to or larger than the predetermined distance, and a drive unit that drives the mobile object in such a way that no obstacle enters the flexible virtual bumper are included. The data processing unit executes control to change the flexible virtual bumper at least either in size or shape. For each one of a plurality of travel route candidates for the mobile object, the data processing unit executes a simulation of changing the bumper size in such a way that no obstacle enters the flexible virtual bumper, and selects a safe travel route.

This configuration enables a device and a method for performing control to change a flexible virtual bumper for maintaining a space between a mobile object and an obstacle to be equal to or larger than a predetermined distance.

Note that effects described herein are merely illustrative and are not intended to be restrictive, and there may be additional effects.

BRIEF DESCRIPTION OF DRAWINGS

FIGS. 1A and 1B illustrates an example of determining a travel route by using a virtual bumper.

FIGS. 7A and 7B illustrates the traveling control processing using the flexible virtual bumper of the present disclosure.

FIG. 8 illustrates the traveling control processing using the flexible virtual bumper of the present disclosure.

FIGS. 9A and 9B illustrates an example of setting the flexible virtual bumper of the present disclosure.

FIG. 17 illustrates a specific example of a "travel route candidate analysis list" generated by the information processing apparatus of the present disclosure.

FIGS. 19A and 19B illustrates a specific example of processing executed by the information processing apparatus of the present disclosure.

FIG. 20 illustrates a hardware configuration example of the information processing apparatus of the present disclosure.

MODE FOR CARRYING OUT THE INVENTION

Figure 2A:
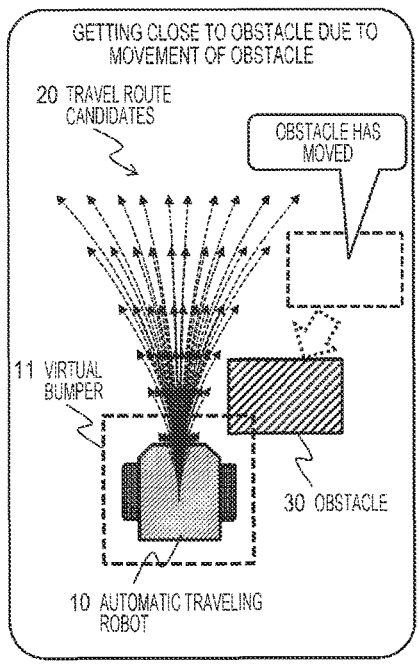
FIGS. 2A, 2B and 2C illustrates a problem in traveling control using the virtual bumper.

An information processing apparatus, an information processing method, and a program of the present disclosure will be described below in detail with reference to the drawings. Note that the description will be made in accordance with the following items.

1. Automatic traveling control using virtual bumper and problem thereof
2. Outline of processing executed by information processing apparatus of present disclosure
3. Configuration example of information processing apparatus of present disclosure
4. Sequence of processing executed by information processing apparatus of present disclosure
5. Hardware configuration example of each device
6. Summary of configuration of present disclosure 1. Automatic Traveling Control Using Virtual Bumper and Problem Thereof First, automatic traveling control using a virtual bumper and a problem thereof will be described.

FIGS. 1A and 1B illustrates examples of determining a travel route of an automatic traveling robot 10. FIGS. 1A and 1B illustrates two drawings:

FIG. 1A Example of determining safe travel route; and
FIG. 1B Example of rejecting dangerous travel route.

Both FIGS. 1A and 1B are based on an assumption that the automatic traveling robot 10 is at a current position in a lower part of the drawing and moves forward (upward in the drawing).

At the current position, the automatic traveling robot 10 selects one optimal travel route from a plurality of travel route candidates, and moves in accordance with the selected travel route.

The travel route candidates are travel route candidates 20 indicated as dotted arrows in the drawing, and are constituted by a large number of candidates.

Note that there is an obstacle 30 ahead on the right side of the automatic traveling robot 10. The automatic traveling robot 10 performs processing of selecting a route that does not cause contact with the obstacle 30. Note that the position of the obstacle 30 can be detected by a sensor such as a camera mounted on the automatic traveling robot 10. Alternatively, detection of the obstacle may be performed with the use of map data stored in a storage unit in the automatic traveling robot 10, or map data acquired from an external server or the like.

The automatic traveling robot 10 performs processing of selecting a route that allows for avoiding contact with the obstacle 30. In this route selection processing, the automatic traveling robot 10 sets a virtual bumper 11 around the automatic traveling robot 10 so as to allow for traveling with a space from the obstacle 30 maintained to be equal to or larger than a certain distance. The automatic traveling robot 10 selects a travel route in which the virtual bumper 11 does not come into contact with the obstacle 30.

The virtual bumper 11 is a virtual bumper for setting a certain separation distance (clearance) between the automatic traveling robot 10 and the obstacle 30 in order to prevent the automatic traveling robot 10 and the obstacle 30 from accidentally coming into contact with each other due to, for example, wobble during traveling of the automatic traveling robot 10.

By selecting a route in which the virtual bumper 11 and the obstacle 30 do not come into contact with each other, it is possible to select, from among the travel route candidates 20, a travel route that curves to the left avoiding the obstacle 30 as illustrated in "FIG. 1A Example of determining safe travel route" in FIGS. 1A and 1B, for example. By traveling in accordance with this selected route, the automatic traveling robot 10 can safely travel a certain distance away from the obstacle 30.

On the other hand, "FIG. 1B Example of rejecting dangerous travel route" in FIGS. 1A and 1B illustrates a route toward the obstacle 30. Such a travel route is not selected from among the travel route candidates 20 and is rejected because the automatic traveling robot 10 is predicted to come into contact with the obstacle 30.

As described above, the automatic traveling robot 10 sets the virtual bumper 11 around the automatic traveling robot 10, and selects and travels, from a large number of the travel route candidates 20, a route that does not cause contact between the virtual bumper 11 and the obstacle 30 so that the automatic traveling robot 10 can travel keeping a certain distance without coming into contact with the obstacle 30.

However, when such traveling control using the virtual bumper is performed, the automatic traveling robot 10 may become unable to travel even in a case where the automatic traveling robot 10 is not in contact with the obstacle 30.

This is because a traveling control unit of the automatic traveling robot 10 performs traveling in accordance with a traveling control rule in which traveling is allowed only in a state where there is no obstacle in the virtual bumper 11 and traveling is stopped when an obstacle has been detected in the virtual bumper 11.

A specific example in which the automatic traveling robot 10 becomes unable to travel even in a case where the automatic traveling robot 10 is not in contact with the obstacle 30 will be described with reference to FIGS. 2A and 2B.

Figure 2B:
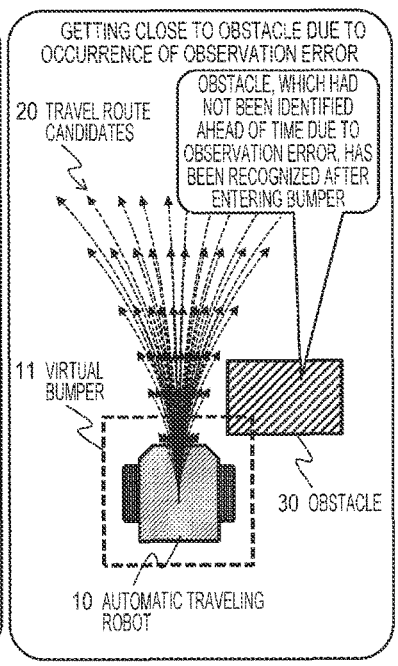
Figure 2C:
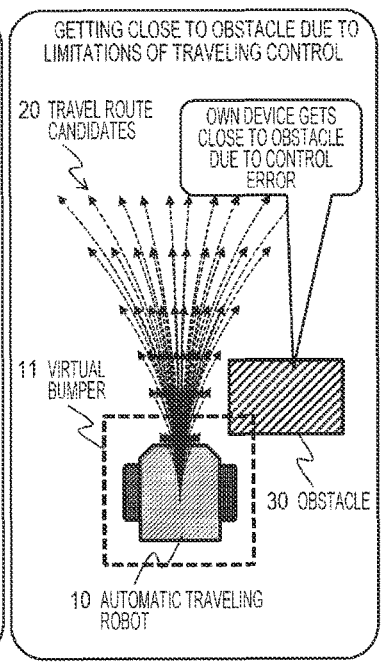

FIGS. 2A, 2B and 2C illustrates a specific example of a case where the automatic traveling robot 10 becomes unable to travel in a case where the automatic traveling robot 10 performs traveling control using the virtual bumper 11 so that the virtual bumper 11 and the obstacle 30 do not come into contact with each other. FIGS. 2A, 2B and 2C illustrates the following three types of specific examples.

FIG. 2A Getting close to obstacle due to movement of obstacle

FIG. 2B Getting close to obstacle due to occurrence of observation error

FIG. 2C Getting close to obstacle due to limitations of traveling control

FIG. 2A Getting close to obstacle due to movement of obstacle illustrates an example of a case where the obstacle 30 is a moving object. As illustrated in FIG. 2A, in a case where the obstacle 30 is a moving object and is moving toward the automatic traveling robot 10, the obstacle 30 may enter the virtual bumper 11 set around the automatic traveling robot 10.

In this case, even in a case where the automatic traveling robot 10 itself is not in contact with the obstacle 30, the control unit of the automatic traveling robot 10 detects that a part of the obstacle 30 has entered the virtual bumper 11, and stops the traveling of the automatic traveling robot 10.

This is because the automatic traveling robot 10 travels in accordance with the basic rule in which traveling is allowed only in a state where there is no obstacle in the virtual bumper 11 and traveling is stopped when an obstacle has been detected in the virtual bumper 11.

(b) Getting close to obstacle due to occurrence of observation error illustrates an event in a case where the automatic traveling robot 10 has erroneously recognized the distance to the obstacle in the surroundings.

In a case where such a recognition error has occurred, there is a possibility that the obstacle 30 enters the virtual bumper 11 set around the automatic traveling robot 10.

Also in this case, the control unit of the automatic traveling robot 10 detects that a part of the obstacle 30 has entered the virtual bumper 11, and stops the traveling of the automatic traveling robot 10.

(c) Getting close to obstacle due to limitations of traveling control illustrates, for example, an event in a case where the automatic traveling robot 10 cannot accurately travel in accordance with a predetermined selected route due to high-speed traveling or the like, and travels at a position slightly deviated from the route, thereby approaching the obstacle in the surroundings.

Also in such a case, there is a possibility that the obstacle 30 enters the virtual bumper 11 set around the automatic traveling robot 10.

Also in this case, the control unit of the automatic traveling robot 10 detects that a part of the obstacle 30 has entered the virtual bumper 11, and stops the traveling of the automatic traveling robot 10.

As described above, most of the automatic traveling robots 10 that travel using the virtual bumper 11 travel in accordance with the traveling control rule in which traveling is allowed only in a state where there is no obstacle in the virtual bumper 11 and traveling is stopped when an obstacle has been detected in the virtual bumper 11. Thus, even in a case where the automatic traveling robot 10 is not in contact with the obstacle 30, there arises a problem in that the automatic traveling robot 10 becomes unable to travel.

The information processing apparatus of the present disclosure solves such a problem, for example.

2. Outline of Processing Executed by Information Processing Apparatus of Present Disclosure Next, an outline of processing executed by the information processing apparatus of the present disclosure will be described.

Figure 3:
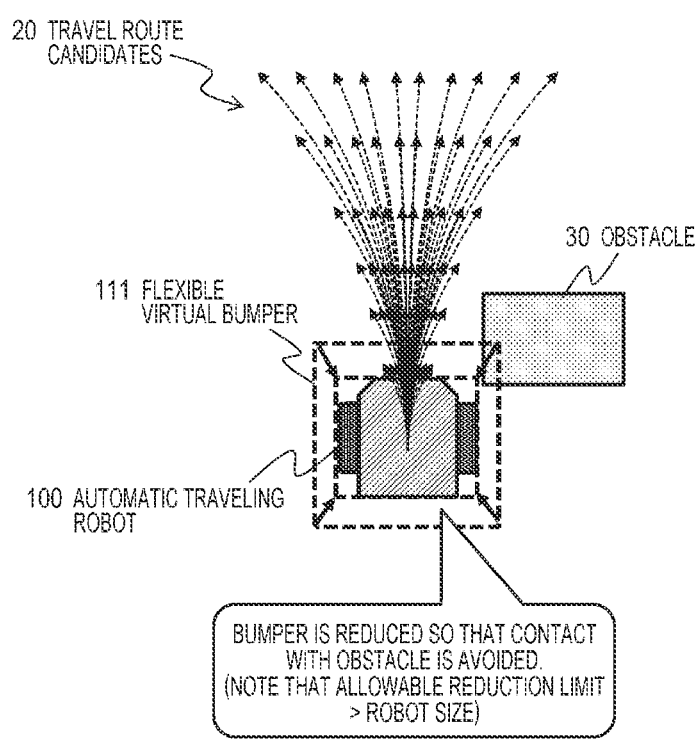
FIG. 3 illustrates an outline of traveling control processing using a flexible virtual bumper of the present disclosure.

FIG. 3 illustrates an automatic traveling robot 100 equipped with the information processing apparatus of the present disclosure. The automatic traveling robot 100 equipped with the information processing apparatus of the present disclosure also sets a virtual bumper and executes traveling control in which contact between the virtual bumper and the obstacle 30 is avoided.

Note that the virtual bumper set by the automatic traveling robot 100 of the present disclosure is a flexible virtual bumper 111 in which the bumper can be changed at least either in size or shape.

The flexible virtual bumper 111 is a virtual bumper that can be freely changed at least either in size or shape.

The example illustrated in FIG. 3 shows a state similar to the example in which the automatic traveling robot becomes unable to travel in a case where the conventional virtual bumper having a fixed size described previously with reference to FIGS. 2A, 2B and 2C is applied. That is, this is a state in which the obstacle 30 has entered the virtual bumper.

For example, in such a case, the information processing apparatus built in the automatic traveling robot 100 of the present disclosure changes the size or shape of the flexible virtual bumper 111. Specifically, the size or shape of the bumper is changed so that the obstacle 30 is not included in the flexible virtual bumper 111.

Note that the flexible virtual bumper 111 can have various shapes. FIG. 3 illustrates an example of a case where a rectangular bumper is used as an example, in which only the size is changed, and the shape is maintained in a rectangular shape.

The example illustrated in FIG. 3 is an example in which the size of the flexible virtual bumper 111 is reduced. With this bumper size reduction processing, it is possible to prevent the obstacle 30 from being included in the flexible virtual bumper 111.

As a result, the information processing apparatus built in the automatic traveling robot 100 can cause the automatic traveling robot 100 to restart traveling.

That is, it is possible to restart traveling in accordance with the basic traveling control rule in which traveling is allowed only in a state where there is no obstacle in the virtual bumper and traveling is stopped when an obstacle has been detected in the virtual bumper.

Note that the minimum reduced size of the flexible virtual bumper 111 is larger than the size of the automatic traveling robot 100.

That is, the information processing apparatus built in the automatic traveling robot 100 can perform control to change the flexible virtual bumper 111 in shape or size of in a variety of ways within a range larger than the shape and size of the automatic traveling robot 100 itself.

Figure 4:
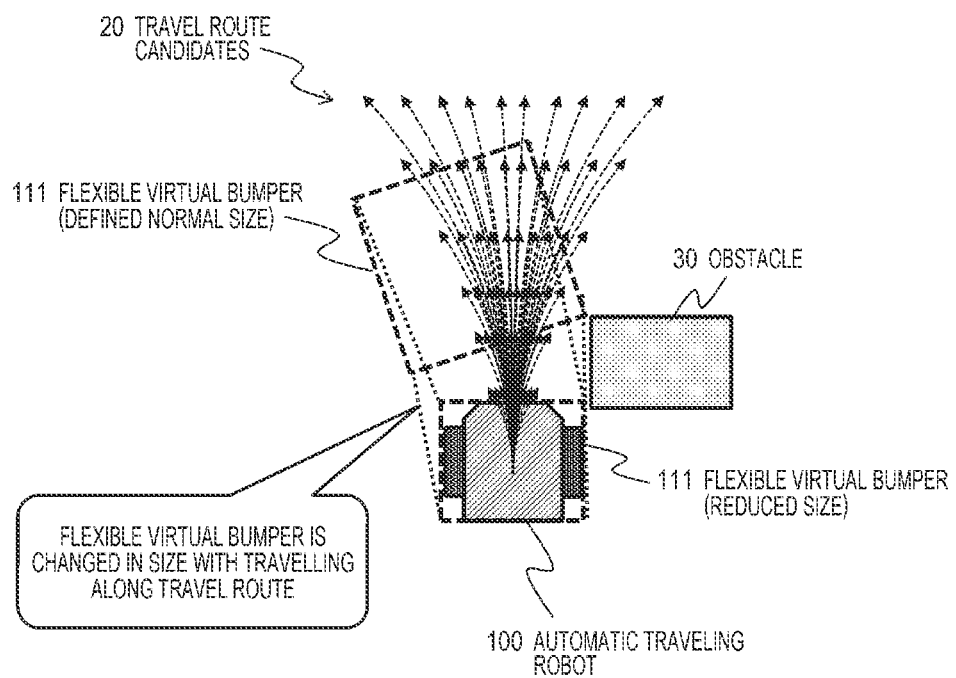
FIG. 4 illustrates an outline of the traveling control processing using the flexible virtual bumper of the present disclosure.

FIG. 4 illustrates an example of bumper size change control in which the size of the flexible virtual bumper 111 is gradually changed in accordance with traveling of the automatic traveling robot 100.

It is assumed that the automatic traveling robot 100 illustrated in FIG. 4 passes by the left side of the obstacle 30, and then turns to the left and travels.

At a point where the automatic traveling robot 100 passes by the left side of the obstacle 30, the separation distance between the automatic traveling robot 100 and the obstacle 30 is very small. The information processing apparatus built in the automatic traveling robot 100 sets the size of the flexible virtual bumper 111 to the minimum size in a section where the automatic traveling robot 100 passes by the left side of the obstacle 30. With this size reduction processing, it is possible to pass by the left side of the obstacle 30 without the obstacle 30 entering the inside of the flexible bumper 111.

Thereafter, after passing by the left side of the obstacle 30, the automatic traveling robot 100 turns to the left and travels. The information processing apparatus of the automatic traveling robot 100 performs processing of gradually increasing the size of the flexible virtual bumper 111 and then returning the size to a normal size that has been defined (defined normal size) as the automatic traveling robot 100 passes by the left side of the obstacle 30 and then turns to the left and travels.

The information processing apparatus of the automatic traveling robot 100 of the present disclosure performs processing of deforming the flexible virtual bumper 111 as described above. That is, in normal times, the flexible virtual bumper 111 is maintained at a defined normal size and shape that have been predefined, and in a case where there is a possibility that an obstacle would enter the flexible virtual bumper 111 or in a case where an obstacle has entered, the size or shape of the flexible virtual bumper 111 is changed. Thus, control is performed to prevent any obstacle from entering the flexible virtual bumper 111.

Note that an allowable range of change in shape or size of the flexible virtual bumper 111 is set to a range larger than the shape or size of the automatic traveling robot 100 itself.

Next, an example of travel route selection processing executed by the information processing apparatus of the automatic traveling robot 100 of the present disclosure will be described with reference to FIG. 5.

Figure 5:
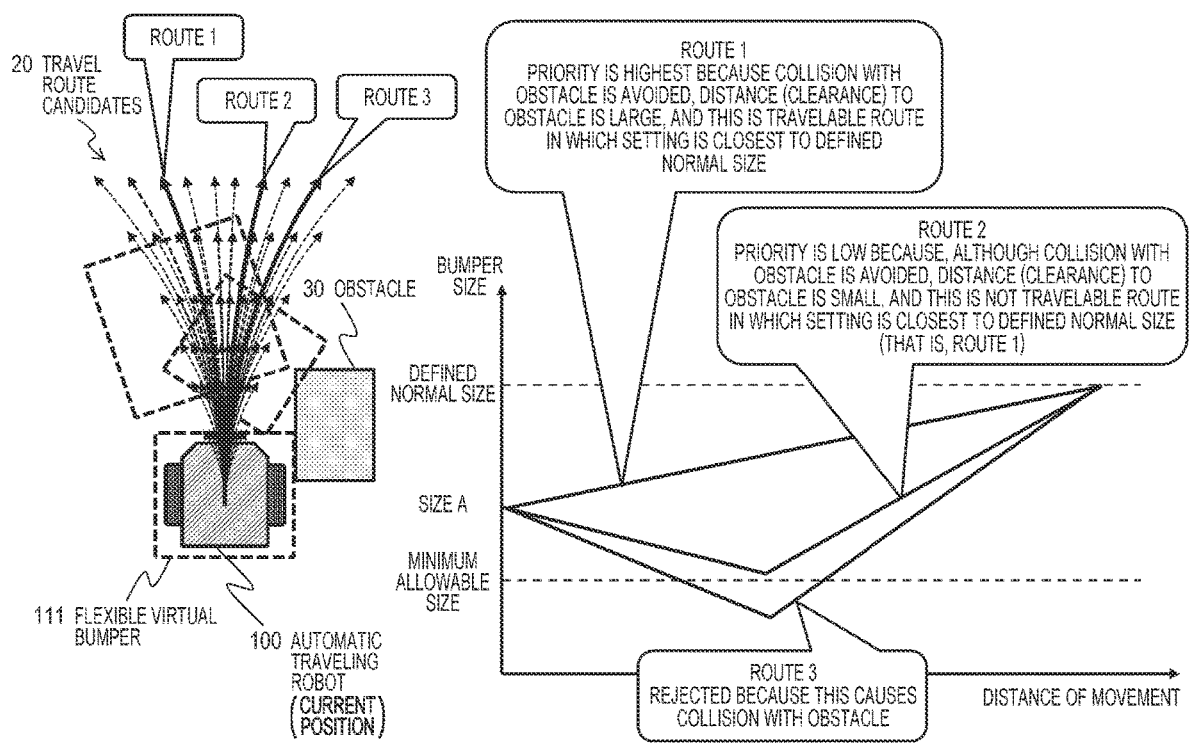
FIG. 5 illustrates an example of changing a bumper size in the traveling control processing using the flexible virtual bumper of the present disclosure.

As illustrated on the left in FIG. 5, the automatic traveling robot 100 travels forward from the current position.

The obstacle 30 is ahead on the right side of the automatic traveling robot 100. The automatic traveling robot 100 performs processing of selecting, from among a plurality of the travel route candidates 20 illustrated in the drawing, a route that does not cause contact with the obstacle 30.

Note that the position of the obstacle 30 can be detected by a sensor such as a camera mounted on the automatic traveling robot 100. Alternatively, the obstacle detection may be performed with the use of map data stored in a storage unit in the automatic traveling robot 100 or map data acquired from an external server or the like.

When selecting one optimal route as a travel route from among the plurality of the travel route candidates 20 illustrated in the drawing, the automatic traveling robot 100 generates change transition data of the bumper size (or shape) required for traveling each route.

Specifically, the data is data such as a graph illustrated on the right side in FIG. 5.

The graph on the right side in FIG. 5 shows distance of movement of the automatic traveling robot 100 on the horizontal axis, and the bumper size of the flexible virtual bumper 111 required to prevent the obstacle 30 from entering the flexible virtual bumper 111 when the automatic traveling robot 100 travels each route on the vertical axis.

The vertical axis shows a defined normal size and a minimum allowable size. The defined normal size is a defined bumper size during normal traveling, such as in a case where there is no obstacle nearby. The minimum allowable size is a minimum size allowed for the flexible virtual bumper 111, and is, for example, a size corresponding to the smallest rectangular shape that is not in contact with an outer periphery of the automatic traveling robot.

Note that, as described above, the flexible virtual bumper 111 can have various shapes. The present example describes, as an example, a case in which only the size is changed, and the shape is maintained in a rectangular shape.

The graph in FIG. 5 illustrates transition of change in the bumper size regarding three routes (routes 1 to 3) selected from a large number of the travel route candidates 20 illustrated on the left in FIG. 5.

The route 1 turns to the left so as to get away from the obstacle 30.

The route 2 gently turns to the right side so as to slightly approach the obstacle 30.

The route 3 greatly turns to the right side so as to approach the obstacle 30.

As understood from the graph, the transition of change in the bumper size for each of these routes is set as follows. Note that, in any of the cases of the routes, the initial size (the size at the current position) is size A.

The route 1 is set so that the size of the flexible virtual bumper 111 progressively increases from the initial size A, and is set so that the size monotonically increases from the initial size A to the defined normal size without the obstacle 30 entering the flexible virtual bumper 111.

The route 2 is set so that the size of the flexible virtual bumper 111 progressively reduces from the initial size A to the minimum allowable size, and is set so that the bumper size progressively increases after the automatic traveling robot 100 has passed by the left side of the obstacle 30, and thus the obstacle 30 does not enter the flexible virtual bumper 111. However, it is necessary to reduce the bumper size to the minimum allowable size.

The route 3 is set so that the size of the flexible virtual bumper 111 progressively reduces from the initial size A to the minimum allowable size or less, and then the bumper size progressively increases.

Among these routes, the route 3 is a route requires the bumper to be reduced to be equal to or less than the minimum allowable size of the flexible virtual bumper 111. This means that the obstacle 30 enters the flexible virtual bumper 111 of the minimum allowable size.

The flexible virtual bumper 111 of the minimum allowable size approximately corresponds to the size of the automatic traveling robot 100 itself, and the route 3 may cause the automatic traveling robot 100 to come into contact with or collide with the obstacle 30.

Thus, the information processing apparatus of the automatic traveling robot 100 rejects the route 3 among the selection candidates.

The information processing apparatus of the automatic traveling robot 100 selects a final travel route from the route 1 or the route 2.

As described previously, the route 2 is set so that the size of the flexible virtual bumper 111 progressively reduces from the initial size A to the minimum allowable size, and is set so that the bumper size progressively increases after the automatic traveling robot 100 has passed by the left side of the obstacle 30, and thus the obstacle 30 does not enter the flexible virtual bumper 111. However, it is necessary to reduce the bumper size to the minimum allowable size.

On the other hand, the route 1 is set so that the size of the flexible virtual bumper 111 progressively increases from the initial size A, and is set so that the size monotonically increases from the initial size A to the defined normal size without the obstacle 30 entering the flexible virtual bumper 111.

As described above, the route 1 allows for traveling with a bumper size closer to the defined normal size compared with the route 2.

On the basis of this result, the information processing apparatus of the automatic traveling robot 100 determines the route 1 as the final travel route.

Note that the route selected as the final travel route is different depending on what is prioritized, for example, safety is prioritized, or shortness of the travel distance or time is prioritized. The priority setting is preferably predefined. The information processing apparatus of the automatic traveling robot 100 performs the route selection processing in accordance with the defined priority.

Figure 6:
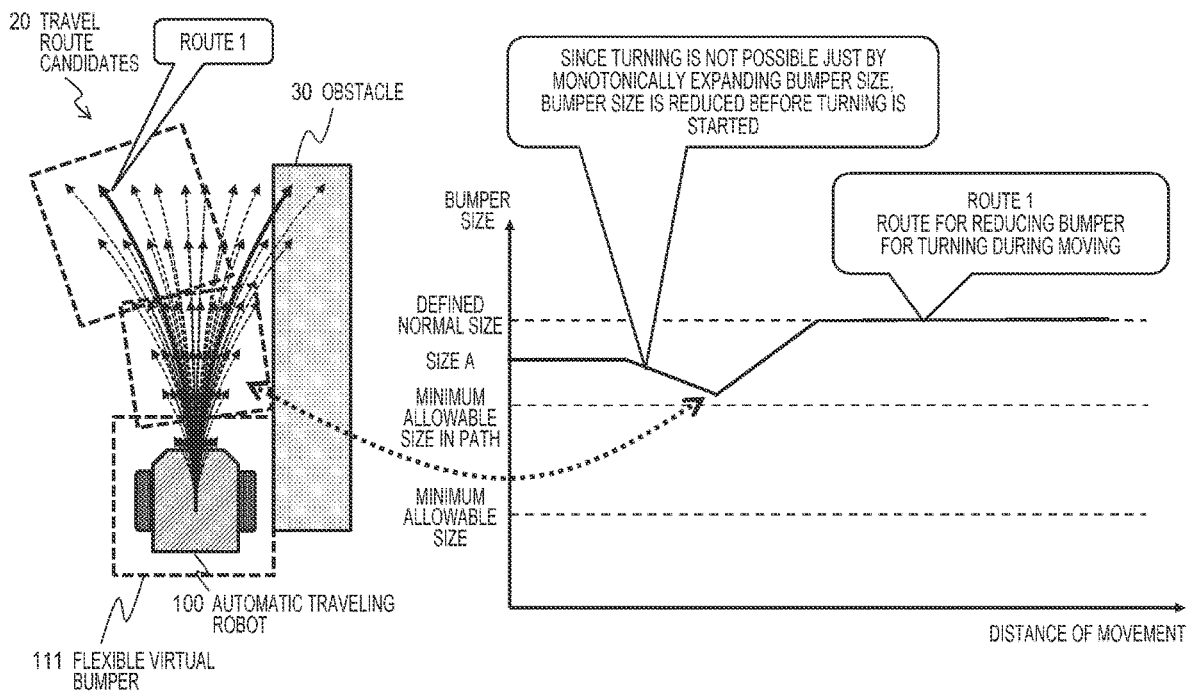
FIG. 6 illustrates an example of changing the bumper size in the traveling control processing using the flexible virtual bumper of the present disclosure.

FIG. 6 illustrates another specific example of the travel route selection processing.

In the example of route selection described with reference to FIG. 5, the route 1 that allows for traveling with a bumper size closer to the defined normal size is selected. The route 1 allows the bumper size to be monotonically expanded from the initial size A and then returned to the defined normal size.

In a case of passing near an obstacle, it is preferable to gradually increase the reduced bumper size as the distance from the obstacle increases, thereby returning the bumper size to the defined normal size. However, in a case of turning processing in which the direction is changed when the automatic traveling robot 30 is in the middle of passing by the obstacle 30 as illustrated in FIG. 6, the size of the flexible virtual bumper 111 needs to be smaller than the size when the automatic traveling robot 30 is traveling along a side surface of the obstacle 30.

This is because, in the present example, the shape of the flexible virtual bumper 111 is rectangular, and when the bumper having the rectangular shape is turned, a vertex of the flexible virtual bumper 111 enters the inside of the obstacle 30.

In order to prevent such a situation, in a case where the information processing apparatus of the automatic traveling robot 100 performs turning processing in which the direction is changed when the automatic traveling robot 30, which is in the middle of traveling the route 1, is in the middle of passing by the obstacle 30 as illustrated in a graph on the right side in FIG. 6, control is performed in such a way that the size of the flexible virtual bumper 111 becomes smaller than the size when the automatic traveling robot 30 is traveling along the side surface of the obstacle 30.

Next, examples of setting a flexible virtual bumper in a variety of devices will be described with reference to FIGS. 7A and 7B and subsequent drawings.

FIGS. 7A and 7B illustrates examples of setting a flexible virtual bumper for a load carrying vehicle.

The information processing apparatus built in the load carrying vehicle detects whether the load carrying vehicle is carrying a load or not, and sets a flexible virtual bumper that differs in size and shape depending on each of the states.

FIG. 7A illustrates an example of setting a flexible virtual bumper 111*a* in the state where the load carrying vehicle is not carrying a load.

In this case, the information processing apparatus built in the load carrying vehicle sets the flexible virtual bumper 111*a* having a size and a shape one size larger than an outer periphery of the load carrying vehicle.

On the other hand, FIG. 7B illustrates an example of setting a flexible virtual bumper 111*b* in the state where the load carrying vehicle is carrying a load.

In this case, the information processing apparatus built in the load carrying vehicle sets the flexible virtual bumper 111*b* having a size and a shape one size larger than an outer periphery of a configuration including not only the load carrying vehicle but also the carried load.

In this case, the flexible virtual bumper 111*b* changes in accordance with the size of the load.

FIG. 8 illustrates a processing example in a case of approaching a charging station for charging a battery built in the automatic traveling robot 100 and charging the battery.

As illustrated in FIG. 8, in a case of charging the built-in battery, the automatic traveling robot 100 needs to come into contact with the charging station. However, when the flexible virtual bumper 111 larger than the outer periphery of the automatic traveling robot 100 has been set, the automatic traveling robot 100 cannot come into contact with the charging station, and the battery cannot be charged.

In order to avoid such a problem, the information processing apparatus in the automatic traveling robot 100 changes the shape or size of the flexible virtual bumper 111 when the automatic traveling robot 100 approaches a predefined device, for example, a charging station, thereby allowing the automatic traveling robot 100 to come into contact with the defined device such as a charging station.

That is, as illustrated in FIG. 8, in order to allow a position where a charging contact 120 of the automatic traveling robot 100 is formed to come into contact with a power supply contact of the charging station, the flexible virtual bumper 111 is deformed so as to be set at a planar position of the position where the charging contact 120 of the automatic traveling robot 100 is formed.

With such bumper deformation processing, the automatic traveling robot 100 can perform charging by bringing the charging contact 120 into contact with the power supply contact of the charging station.

FIGS. 9A and 9B illustrate an example of setting a flexible virtual bumper for a walking type robot and an example of setting a flexible virtual bumper for a hand-shaped robot that performs a gripping operation.

FIG. 9A illustrates the example of setting the flexible virtual bumper 111 for the walking type robot. In the case of the walking robot, the shape of the flexible virtual bumper 111 is set so as to include limbs during walking. Note that the lower surfaces of the legs are set so as to be in contact with the flexible virtual bumper 111.

By setting the flexible virtual bumper 111 having such a shape, it is possible to walk through a narrow space while avoiding the limbs from coming into contact with an obstacle.

FIG. 9B illustrates the example of setting the flexible virtual bumper 111 for the hand-shaped robot that performs a gripping operation.

In the case of the hand-shaped robot, a bumper shape is set so as to allow a fingertip to grip or touch an object at the time of operation of gripping with the hand. As illustrated in the drawing, a bumper shape surrounding only the portion of an arm is formed, and a bumper is not formed in the portions of the hand and fingers.

By setting the virtual bumper having such a shape, it is possible to prevent the arm from coming into contact with an obstacle, and enable gripping with a fingertip.

Figure 10:
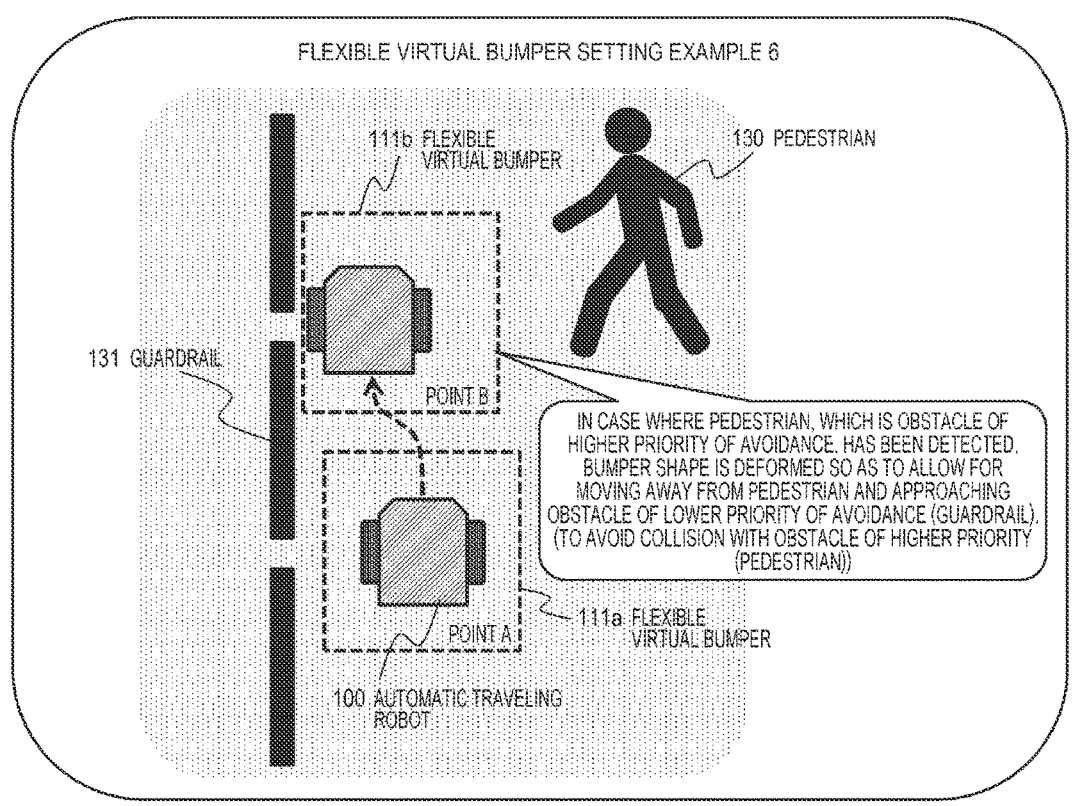
FIG. 10 illustrates the traveling control processing using the flexible virtual bumper of the present disclosure.

FIG. 10 illustrates a modified example of the flexible virtual bumper 111 in a case where a pedestrian 130 is approaching a travel path on which the automatic traveling robot 100 is traveling along a guardrail 131.

In a case where the information processing apparatus of the automatic traveling robot 100 has detected the pedestrian 130, which is an obstacle of a higher priority of avoidance, as described above, the shape of the flexible virtual bumper 111 is deformed so that the automatic traveling robot 100 can move away from the pedestrian 130 and further approach the guardrail 131, which is an obstacle of a lower priority of avoidance.

That is, a flexible virtual bumper having a shape with a larger clearance on an obstacle side, the obstacle being of a higher priority of avoidance is set.

As illustrated in the drawing, at a point a, the flexible virtual bumper 111a that is spaced equally on the left and right from the automatic traveling robot 100 is set. At a point b, the approaching pedestrian 130 is detected, and deformation processing is performed in which a rectangular frame of the flexible virtual bumper 111b is set to be closer to a side surface of the robot on the guardrail side on the left side of the automatic traveling robot 100.

With this deformation processing, the automatic traveling robot 100 can approach the guardrail 131 side as close as possible, and the possibility of collision or contact with the pedestrian 130, which is an obstacle of a higher priority of avoidance, can be reduced.

3. Configuration Example of Information Processing Apparatus of Present Disclosure Next, a configuration example of the information processing apparatus of the present disclosure will be described.

Figure 11:
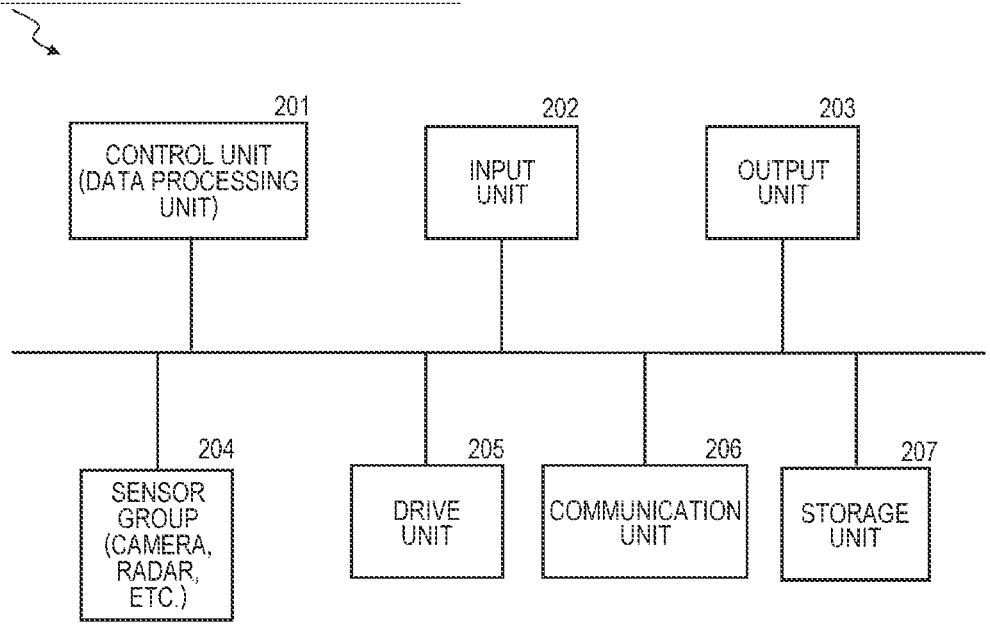
FIG. 11 illustrates a configuration example of an information processing apparatus of the present disclosure.

FIG. 11 is a block diagram illustrating a configuration example of an information processing apparatus 200 of the present disclosure.

The information processing apparatus 200 is configured inside the automatic traveling robot 100 illustrated in FIG. 3 and the like, for example. Furthermore, the information processing apparatus 200 is configured as a control device of the load carrying vehicle illustrated in FIGS. 7A and 7B or the robots illustrated in FIGS. 9A and 9B.

As illustrated in FIG. 11, the information processing apparatus 200 includes a control unit (data processing unit) 201, an input unit 202, an output unit 203, a sensor group 204, a drive unit 205, a communication unit 206, and a storage unit 207.

The control unit (data processing unit) 201 controls processing executed in the information processing apparatus 200. For example, the control unit 201 executes processing in accordance with a control program stored in the storage unit 207. The control unit 201 is a data processing unit having a processor having a program execution function.

The control unit (data processing unit) 201 executes, for example, processing of selecting a travel route from travel route candidates, setting of a flexible virtual bumper, and control of changing a size or a shape.

Specifically, as control to change a flexible virtual bumper for maintaining a space between an obstacle and a mobile object such as an automatic traveling robot to be equal to or larger than a predetermined distance, processing of control to change the flexible virtual bumper at least either in size or shape or the like is executed.

Moreover, the control unit (data processing unit) 201 executes, for each one of a plurality of the travel route candidates, a simulation of changing the flexible virtual bumper at least either in size or shape in such a way that no obstacle enters the flexible virtual bumper, and executes processing for selecting a safe travel route.

These pieces of processing can be executed in accordance with the program stored in the storage unit 207.

The input unit 202 is an interface that allows for a variety of types of data input by a user, and is constituted by a touch panel, various switches, and the like.

The output unit 203 is a speaker that outputs an alert or sound, a display that outputs an image, and an output unit that outputs light or the like.

The sensor group 204 is constituted by a variety of sensors such as a camera, a microphone, a radar, and a distance sensor.

The drive unit 205 controls processing of driving or movement of a robot or a vehicle, or the like. For example, the drive unit 205 is constituted by a wheel drive unit, a direction control mechanism, and the like.

Specifically, for example, the drive unit 205 drives a mobile object such as an automatic traveling robot in such a way that no obstacle enters the flexible virtual bumper determined by the control unit (data processing unit) 201.

The communication unit 206 executes processing of communication with, for example, a controller, or an external device such as a robot management server, a map information provision server, or a building management server.

The storage unit 207 stores, in addition to the program executed by the control unit 201, robot information or transportation equipment information, for example.

Note that the control unit (data processing unit) 201 performs control in accordance with a control target. For example, different processing is performed in a case where the automatic traveling robot 100 illustrated in FIG. 3 and the like is controlled, and in a case where the load carrying vehicle illustrated in FIGS. 7A and 7B or the robot illustrated in FIGS. 9A and 9B is controlled.

As an example, a control configuration of the control unit (data processing unit) 201 in the case where the automatic traveling robot 100 illustrated in FIG. 3 and the like is controlled will be described with reference to FIG. 12.

Figure 12:
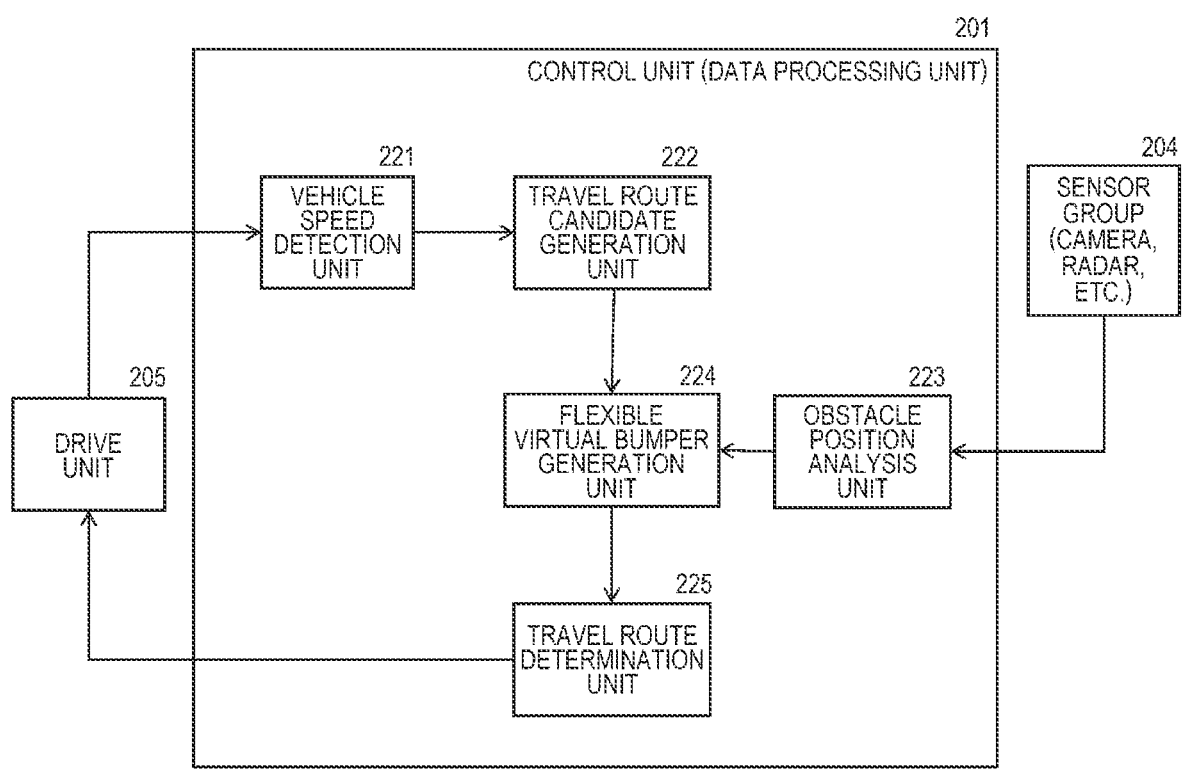
FIG. 12 illustrates a configuration example of the information processing apparatus of the present disclosure.

FIG. 12 is a block diagram illustrating the control configuration of the control unit (data processing unit) 201 in the case where the automatic traveling robot 100 illustrated in FIG. 3 and the like is controlled, using a block for each piece of control processing.

A vehicle speed detection unit 221 detects a vehicle speed on the basis of drive information from the drive unit 205, and inputs the vehicle speed to a travel route candidate generation unit 222.

The travel route candidate generation unit 222 generates travel route candidates. For example, a plurality of travelable routes for arriving at a destination from the current position is generated.

Specifically, for example, the plurality of the travel route candidates 20 as illustrated in FIGS. 3 to 6 is generated or input.

Note that, in this generation of travel route candidates, the generation processing is performed in consideration of the current vehicle speed.

Note that the travel route candidates may be generated by the information processing apparatus itself on the basis of, for example, map data acquired in advance, or may be acquired from an external controller, server, or the like.

The travel route candidates generated by the travel route candidate generation unit 222 are input to a flexible virtual bumper generation unit 224.

The flexible virtual bumper generation unit 224 generates a flexible virtual bumper to be set around the automatic traveling robot 100 illustrated in FIG. 3 and the like.

For each of the travel route candidates generated by the travel route candidate generation unit 222, the flexible virtual bumper generation unit 224 determines whether or not safe travel avoiding obstacles is possible, and performs processing of determining a route that allows for safe traveling as a final travel route.

In this route determination processing, the positions of the obstacles analyzed by an obstacle position analysis unit 223 are used. The positions of the obstacles may be generated on the basis of, for example, information acquired by the sensor group 204 or map data acquired in advance, or may be acquired from an external controller, server, or the like.

The flexible virtual bumper generation unit 224 performs, for each of the travel route candidates, processing of determining whether or not safe travel while avoiding obstacles is possible by changing the size and shape of the flexible virtual bumper.

A specific example of this processing will be described with reference to a drawing in the description of processing in a flowchart described later.

The flexible virtual bumper generation unit 224 outputs an evaluation value as an analysis result of each travel route candidate to a travel route determination unit 225.

The travel route determination unit 225 determines one final travel route on the basis of the evaluation result of each travel route candidate generated by the flexible virtual bumper generation unit 224.

Note that this final travel route determination processing is executed in accordance with a priority determined in advance, such as full priority, travel time priority, or travel distance priority.

4. Sequence of Processing Executed by Information Processing Apparatus of Present Disclosure Next, a sequence of processing executed by the information processing apparatus of the present disclosure will be described.

Figure 13:
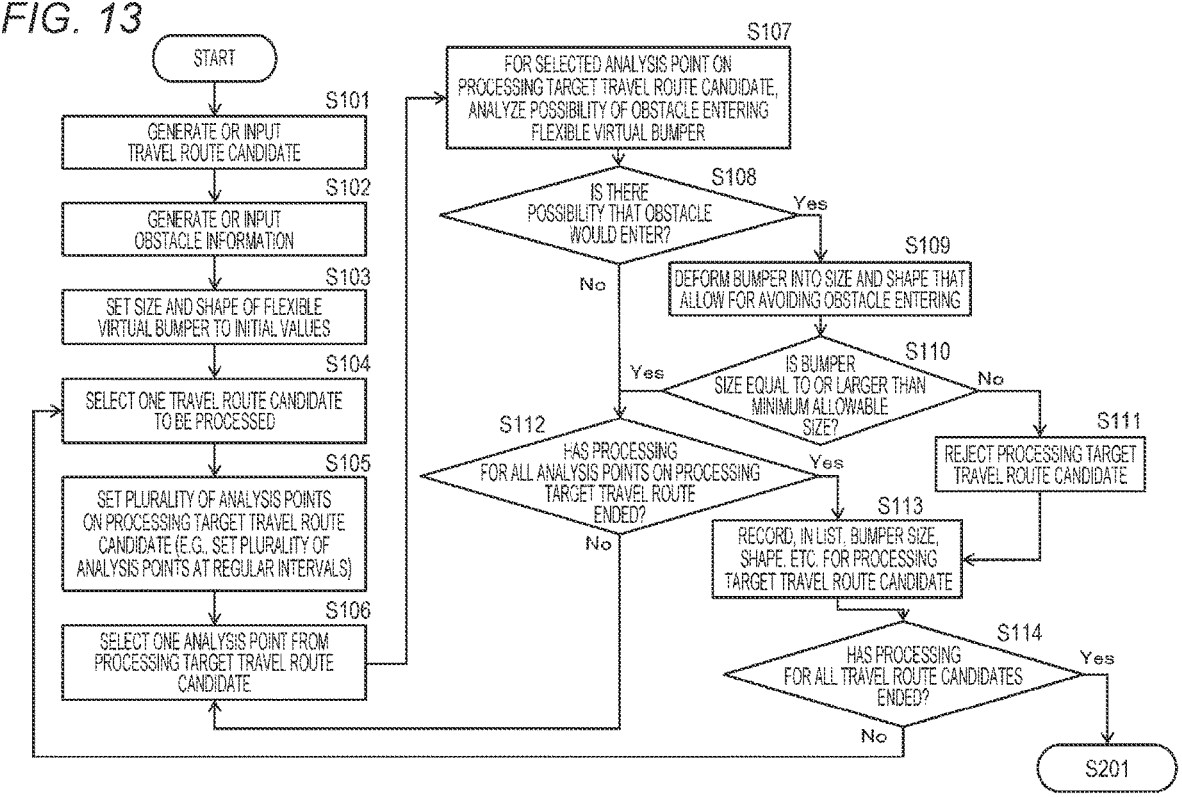
FIG. 13 illustrates a flowchart illustrating a sequence of processing executed by the information processing apparatus of the present disclosure.

FIG. 13 is a flowchart illustrating the sequence of processing executed by the information processing apparatus of the present disclosure.

The information processing apparatus that executes the processing in accordance with the flow illustrated in FIG. 13 has a configuration illustrated in FIG. 11, and is configured inside the automatic traveling robot 100 illustrated in FIG. 3 and the like, for example.

Note that the processing in accordance with the flowchart illustrated in FIG. 13 can be executed by the control unit (data processing unit) of the information processing apparatus in accordance with a program stored in the storage unit. For example, the processing can be performed as program execution processing by a processor such as a CPU having a program execution function.

The processing of each step of the flow illustrated in FIG. 13 will be described below.

(Step S101)

First, in step S101, the control unit (data processing unit) of the information processing apparatus generates or inputs a travel route candidate.

For example, a plurality of travelable routes for arriving at the destination from the current position is generated or input.

Specifically, for example, the plurality of the travel route candidates 20 as illustrated in FIGS. 3 to 6 is generated or input.

Note that, as described above, in this generation of travel route candidates, the generation processing is performed in consideration of the current vehicle speed. However, in a case where the vehicle speed is 0, the setting can be made freely.

The travel route candidates may be generated by the information processing apparatus itself on the basis of, for example, map data acquired in advance, or may be acquired from an external controller, server, or the like.

(Step S102)

Next, in step S102, the control unit (data processing unit) of the information processing apparatus generates or inputs obstacle information.

The obstacle information may be generated by the information processing apparatus itself on the basis of, for example, information acquired by the sensor group 204 or map data acquired in advance, or may be acquired from an external controller, server, or the like.

(Step S103)

Next, in step S103, the control unit (data processing unit) of the information processing apparatus sets the size and shape of the flexible virtual bumper to initial values.

The initial values are, for example, the size and shape of a flexible virtual bumper set in a case where there is no obstacle in the proximity, and constituted by a defined normal size and a defined normal shape.

(Step S104)

Next, in step S104, the control unit (data processing unit) of the information processing apparatus selects one travel route candidate to be processed from the plurality of the travel route candidates generated or input in step S101.

The following processing of steps S105 to S120 is repeatedly executed for each travel route.

(Step S105)

Next, in step S105, the control unit (data processing unit) of the information processing apparatus sets a plurality of analysis points on the route of the one travel route candidate to be processed selected in step S104.

This processing will be described with reference to FIG. 14.

First, a flexible virtual bumper 250 having the initial values is set around the automatic traveling robot 100. This processing is the processing of step S103.

Figure 14:
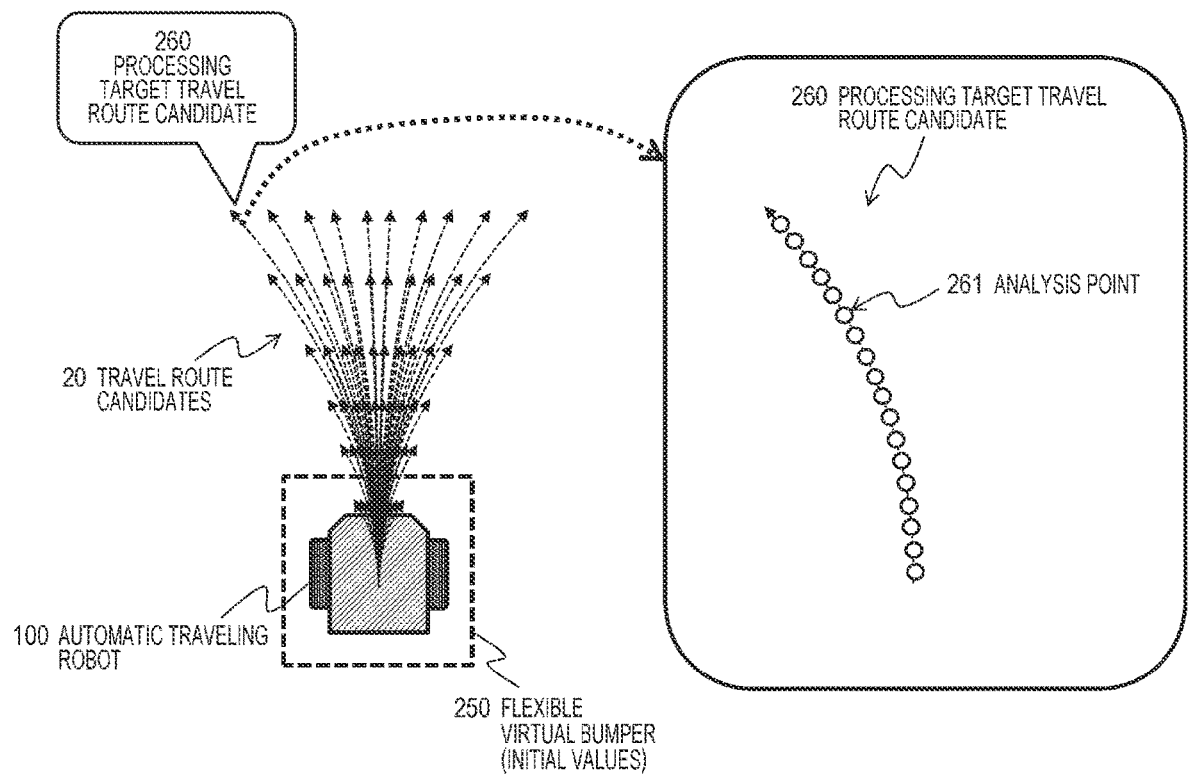
FIG. 14 illustrates a specific example of processing executed by the information processing apparatus of the present disclosure.

In step S105, a plurality of analysis points 261 is set on one travel route candidate to be processed selected in step S104, for example, the route of a processing target travel route candidate 260 illustrated in FIG. 14.

The following processing of steps S106 to S112 is repeatedly executed for each analysis point.

(Step S106)

Next, in step S106, the control unit (data processing unit) of the information processing apparatus selects one analysis point from the processing target travel route candidate as an analysis point to be processed.

(Steps S107 to S108)

Next, in step S107, for the one analysis point selected from the processing target travel route candidate, the control unit (data processing unit) of the information processing apparatus analyzes the possibility of an obstacle entering the flexible virtual bumper.

Moreover, if it is determined in step S108 that an obstacle would enter the flexible virtual bumper, the processing proceeds to step S109.

On the other hand, if it is determined in step S108 that no obstacle would enter the flexible virtual bumper, the processing proceeds to step S112.

A specific example will be described with reference to FIG. 15A.

Figure 15A:
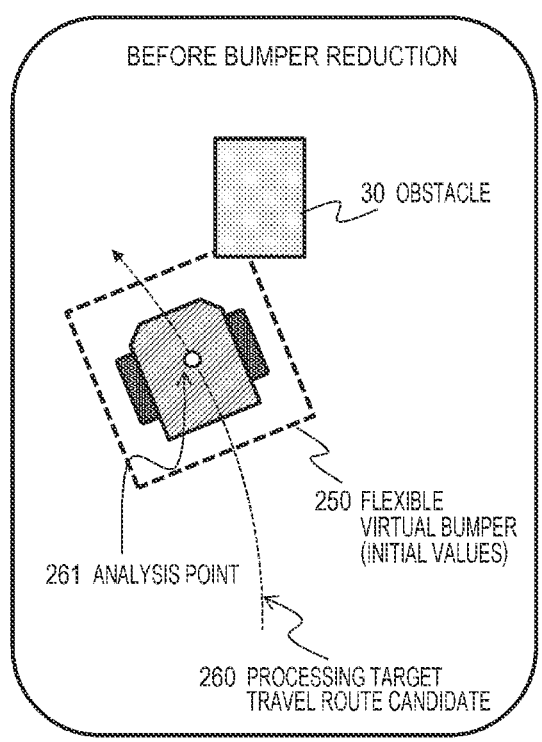
FIGS. 15A and 15B illustrates a specific example of processing executed by the information processing apparatus of the present disclosure.

FIG. 15A is a diagram based on a supposition that the automatic traveling robot 100 has moved to the position of one of the analysis points 261. The control unit (data processing unit) of the information processing apparatus generates estimation data based on the supposition that the automatic traveling robot 100 has moved to the position of one of the analysis points 261 as described above, and executes the processing of steps S107 to S108.

In the example illustrated in FIG. 15A, it is determined that an obstacle would enter the flexible virtual bumper 250. In this case, the determination in step S108 is Yes, and the processing proceeds to step S109.

(Step S109)

If it is determined in step S108 that an obstacle would enter the flexible virtual bumper, the processing proceeds to step S109.

In step S109, the control unit (data processing unit) of the information processing apparatus changes the size and shape of the flexible virtual bumper to prevent the obstacle from entering the flexible virtual bumper.

A specific example will be described with reference to FIGS. 15A and 15B. As described previously, FIG. 15A illustrates an example in which it is determined that an obstacle would enter the flexible virtual bumper 250.

Figure 15B:
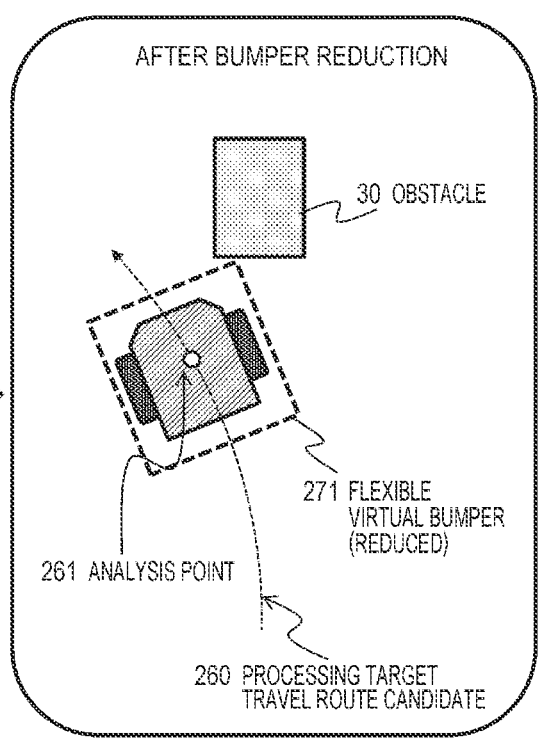

In such a case, in step S109, the control unit (data processing unit) of the information processing apparatus changes the size and shape of the flexible virtual bumper as illustrated in FIG. 15B to prevent the obstacle from entering a flexible virtual bumper 271.

(Step S110)

Next, in step S110, the control unit (data processing unit) of the information processing apparatus determines whether or not the bumper size of the flexible virtual bumper is maintained to be equal to or larger than the minimum allowable size.

As described above, the minimum allowable size is a minimum size allowed for the flexible virtual bumper, and is, for example, a size corresponding to the smallest rectangular shape that is not in contact with the outer periphery of the automatic traveling robot.

In a case where it is determined in step S110 that the bumper size of the flexible virtual bumper is maintained to be equal to or larger than the minimum allowable size, the processing proceeds to step S112.

On the other hand, if it is determined that the bumper size of the flexible virtual bumper is not equal to or larger than the minimum allowable size, the processing proceeds to step S111.

(Step S111)

If it is determined in step S110 that the bumper size of the flexible virtual bumper is not equal to or larger than the minimum allowable size, the processing proceeds to step S111.

In this case, the control unit (data processing unit) of the information processing apparatus rejects the travel route candidate including the analysis point currently being processed. That is, route rejection processing for exclusion from the final travel route is executed.

A specific example of this processing will be described with reference to FIGS. 16A and 16B.

Figure 16A:
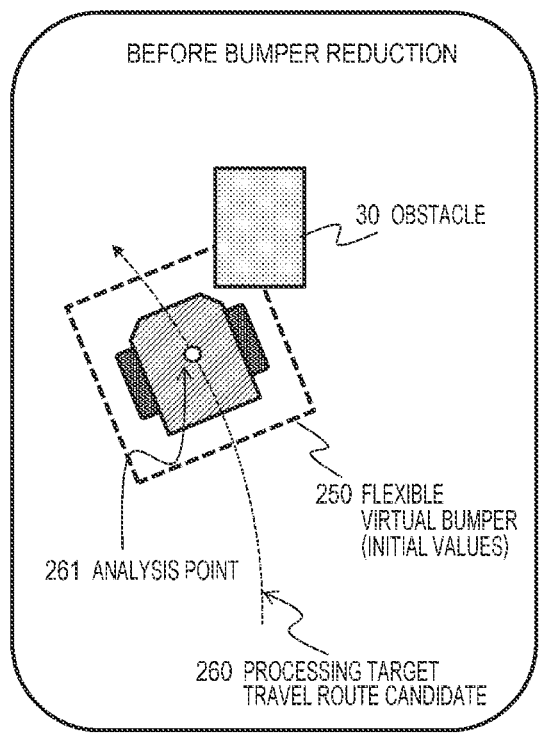
FIGS. 16A and 16B illustrates a specific example of processing executed by the information processing apparatus of the present disclosure.

FIG. 16A is a diagram similar to that described previously with reference to FIG. 15A, and is an example in which it is determined that an obstacle would enter the flexible virtual bumper 250.

Figure 16B:
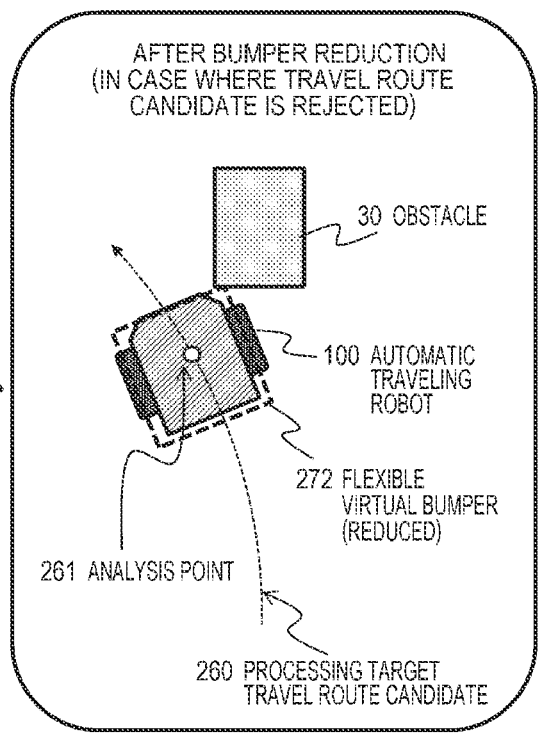

In such a case, in step S109, the control unit (data processing unit) of the information processing apparatus changes the size and shape of the flexible virtual bumper as illustrated in FIG. 16B to prevent the obstacle from entering a flexible virtual bumper 272.

However, the reduced flexible virtual bumper 272 illustrated in FIG. 16B has a size smaller than the size of the automatic traveling robot 100. That is, the size of the reduced flexible virtual bumper 272 is not equal to or larger than the minimum allowable size. In this case, the determination in step S110 is No, and the travel route candidate including this analysis point is rejected in step S111.

After the processing of rejecting the travel route candidate including this analysis point has been performed in step S111, the processing proceeds to step S113.

(Step S112)

On the other hand, if it is determined in step S110 that the bumper size of the flexible virtual bumper is equal to or larger than the minimum allowable size, the processing proceeds to step S112.

In step S112, it is determined whether or not the analysis processing for all the analysis points on the travel route candidate to be processed has been completed.

In a case where an unprocessed analysis point remains, the processing returns to step S106, and the processing in and after step S106 is executed for the unprocessed analysis point.

On the other hand, if it is determined in step S112 that the processing for all the analysis points has been completed, the processing proceeds to step S113.

(Step S113)

When the processing of rejecting the travel route candidate in step S111 or the processing of analyzing all the analysis points on the travel route candidate in step S112 is completed, the processing proceeds to step S113.

In step S113, the control unit (data processing unit) of the information processing apparatus records, in a "travel route candidate analysis list", information regarding analysis of the processing target travel route candidate such as bumper size information and shape information.

A specific example of the "travel route candidate analysis list" will be described with reference to FIG. 17.

FIG. 17 illustrates an example of the "travel route candidate analysis list" generated by the control unit (data processing unit) of the information processing apparatus.

As illustrated in FIG. 17, the "travel route candidate analysis list" is a list in which the following pieces of data are recorded in association with each other.

(a) Travel route candidates
(b) Data about transition of bumper size in accordance with distance
(c) Average value of bumper size (size ratio (initial value=1.0))
(d) Minimum value of bumper size (size ratio (initial value=1.0))
(e) Valid or rejected (valid in a case where minimum value≥minimum allowable size holds)
(f) Bumper shape
(g) Route travel distance (m)

(a) Travel route candidates are identifiers of the corresponding travel route candidates.
(b) Data about transition of bumper size in accordance with distance is transition data indicating a change in the bumper size of the flexible virtual bumper in accordance with a movement distance of the travel route candidate similar to that described previously with reference to FIGS. 5 and 6.
(c) Average value of bumper size (size ratio (initial value=1.0)) is an average value of the sizes of the flexible virtual bumper set for each travel route candidate. Note that, with the initial value of the bumper size of the flexible virtual bumper set to 1.0, a ratio to the initial value (1.0) is recorded for the average value of the bumper size.
(d) Minimum value of bumper size (size ratio (initial value=1.0)) is a minimum value of the size of the flexible virtual bumper set for each travel route candidate. Note that, also for this minimum value, with the initial value of the bumper size of the flexible virtual bumper set to 1.0, a ratio to the initial value (1.0) is recorded.

In (e) valid or rejected (valid in a case where minimum value≥minimum allowable size holds), whether each travel route candidate is valid or a rejected route is recorded.

"Valid" is recorded if minimum value≥minimum allowable size holds, and "Rejected" is recorded if minimum value<minimum allowable size holds.

Note that, in the example illustrated in the drawing, the minimum allowable size is set to 0.6 (ratio to initial value=1/0).

In (f) bumper shape, the bumper shape is recorded. Note that, in a case where the shape changes with transition of time, data about the change in shape with transition of time is recorded.

In (g) route travel distance (m), the distance of each travel route candidate is recorded.

In step S113, the control unit (data processing unit) of the information processing apparatus records information regarding analysis of the processing target travel route candidate in, for example, the "travel route candidate analysis list" having a data configuration as illustrated in FIG. 17.

(Step S114)

Finally, in step S114, the control unit (data processing unit) of the information processing apparatus determines whether or not the analysis processing for all the travel route candidates has ended.

If it is determined that the analysis processing for all the travel route candidates has not ended, the processing returns to step S104, and the processing in and after step S104 is executed for the unprocessed travel route candidate.

On the other hand, if it is determined that the analysis processing for all the travel route candidates has ended, the processing proceeds to step S201.

As described with reference to the flowchart illustrated in FIG. 13, the control unit (data processing unit) of the information processing apparatus of the present disclosure executes, for each one of the plurality of the travel route candidates, a simulation of changing the flexible virtual bumper at least either in size or shape in such a way that no obstacle enters the flexible virtual bumper, and generates a travel route candidate analysis list in which the simulation result is recorded.

Figure 18:
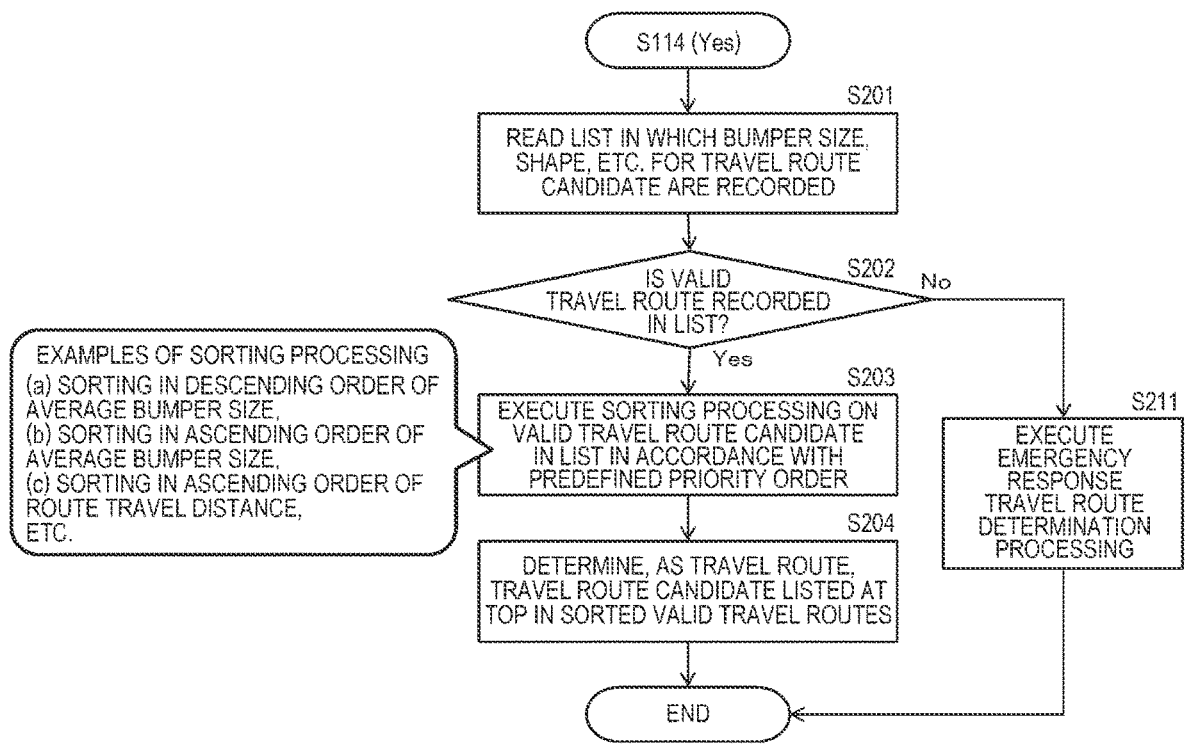
FIG. 18 illustrates a flowchart illustrating a sequence of processing executed by the information processing apparatus of the present disclosure.

Next, processing after it is determined in step S114 that the analysis processing for all the travel route candidates has ended, that is, processing in and after step S201 after the "travel route candidate analysis list" in which the simulation results are recorded has been completed, will be described with reference to a flowchart illustrated in FIG. 18.

(Step S201)

In step S114, after the analysis processing for all the travel route candidates has ended and the analysis results for all the travel route candidates have been recorded in the "travel route candidate analysis list", the processing in and after step S201 is executed.

In step S201, the control unit (data processing unit) of the information processing apparatus reads the "travel route candidate analysis list".

(Step S202)

Next, in step S202, the control unit (data processing unit) of the information processing apparatus determines whether or not there is a valid travel route candidate in the read "travel route candidate analysis list".

That is, it is determined whether or not there is an entry recorded as "Valid" in the item "(e) valid or rejected (valid in a case where minimum value≥minimum allowable size holds)" of the "travel route candidate analysis list" described previously with reference to FIGS. 15A and 15B.

As described above, in "(e) valid or rejected (valid in a case where minimum value≥minimum allowable size holds)", whether each travel route candidate is valid or a rejected route is recorded.

"Valid" is recorded if minimum value minimum allowable size holds, and "Rejected" is recorded if minimum value<minimum allowable size holds.

If it is determined that there is a valid travel route candidate in the read "travel route candidate analysis list", the processing proceeds to step S203.

On the other hand, if it is determined that there is no valid travel route candidate in the read "travel route candidate analysis list", the processing proceeds to step S211.

(Step S203)

If it is determined in the determination processing of step S202 that there is a valid travel route candidate in the read "travel route candidate analysis list", the processing proceeds to step S203.

In step S203, the control unit (data processing unit) of the information processing apparatus selects a valid travel route candidate in the "travel route candidate analysis list", and executes sorting processing on the selected travel route candidate in accordance with a predefined priority order.

Examples of the sorting processing include the following sorting processing.

(a) Sorting in descending order of average bumper size
(b) Sorting in ascending order of average bumper size
(c) Sorting in ascending order of route travel distance These pieces of sorting processing can be executed.

(a) Sorting in descending order of average bumper size is processing performed in a case where, for example, an algorithm that determines a travel route with the highest priority given to safety is applied.

(b) Sorting in ascending order of average bumper size is processing performed in a case where, for example, an algorithm that determines a travel route with the highest priority given to effective use of a travel path is applied.

(c) Sorting in ascending order of route travel distance is processing performed in a case where, for example, an algorithm that determines a travel route with the highest priority given to shortening of the time it takes to arrive at the destination is applied.

As described above, different types of sorting processing are executed in accordance with a variety of different priority settings.

(Step 204)

Finally, in step S204, the control unit (data processing unit) of the information processing apparatus selects the travel route candidate listed at the top in the sorting processing in step S203, and determines the selected travel route candidate as a final travel route.

(Step S211)

On the other hand, if it is determined in the determination processing of step S202 that there is no valid travel route candidate in the read "travel route candidate analysis list", the processing proceeds to step S211.

In step S211, the control unit (data processing unit) of the information processing apparatus executes emergency response travel route determination processing.

This is processing performed in a case where there is no valid travel route candidate in the "travel route candidate analysis list", and is emergency response processing performed in a case where all travel route candidates recorded in the "travel route candidate analysis list" are rejected routes.

In this case, the control unit (data processing unit) of the information processing apparatus executes emergency response travel route determination processing in step S211.

FIG. 19 illustrates a specific example.

The case where there is no valid travel route candidate in the "travel route candidate analysis list" is, for example, a state illustrated in State a in FIG. 19(a).

Any of the travel route candidates 20 illustrated in FIG. 19(a) results in collision with the obstacle 30, and it is not possible to select a travelable route from the travel route candidates 20. That is, all the travel route candidates registered in the "travel route candidate analysis list" are rejected travel routes.

In such a case, in step S211, the control unit (data processing unit) of the information processing apparatus determines an emergency response travel route 280 as illustrated in FIG. 19(b), for example.

The emergency response travel route 280 as illustrated in FIG. 19(b) is a route for making a U-turn to avoid the obstacle 30.

With such a route, the position of the automatic traveling robot 100 is changed, and after the change, processing of generating a travel route candidate is executed at a new position.

5. Hardware Configuration Example of Information Processing Apparatus

Next, a hardware configuration example of the information processing apparatus will be described with reference to FIG. 20.

The hardware configuration illustrated in FIG. 20 illustrates an example of a hardware configuration applicable as an information processing apparatus.

A central processing unit (CPU) 301 functions as a data processing unit that executes various types of processing in accordance with a program stored in a read only memory (ROM) 302 or a storage unit 308. For example, processing in accordance with the sequence described in the above embodiment is executed. A random access memory (RAM) 303 stores a program to be executed by the CPU 301, data, and the like. These CPU 301, ROM 302, and RAM 303 are connected to each other by a bus 304.

The CPU 301 is connected to an input/output interface 305 via the bus 304, and the input/output interface 305 is connected with an input unit 306 constituted by various switches, a keyboard, a touch panel, a mouse, a microphone, or the like, and an output unit 307 constituted by a display, a speaker, or the like.

The storage unit 308 connected to the input/output interface 305 is constituted by, for example, a hard disk, and stores a program to be executed by the CPU 301 and various types of data. A communication unit 309 functions as a transmission/reception unit for data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and records or reads data.

6. Summary of Configuration of Present Disclosure

The embodiment of the present disclosure has been described above in detail with reference to the specific embodiment. However, it is obvious that those skilled in the art may make modifications and substitutions to the embodiment without departing from the gist of the present disclosure. That is, the present invention has been disclosed in the form of exemplification and should not be interpreted restrictively. In order to determine the gist of the present disclosure, the claims should be taken into consideration.

Note that the technology disclosed in the present specification may have the following configurations.

(1) An information processing apparatus including:
a data processing unit that executes control to change a flexible virtual bumper for maintaining a space between a mobile object and an obstacle to be equal to or larger than a predetermined distance; and
a drive unit that drives the mobile object in such a way that no obstacle enters the flexible virtual bumper,
in which the data processing unit executes control to change the flexible virtual bumper at least either in size or shape.

(2) The information processing apparatus according to (1), in which
the data processing unit controls the size of the flexible virtual bumper within a range in which the size is larger than a minimum allowable size, the minimum allowable size being a size corresponding to a size of the mobile object.

(3) The information processing apparatus according to (1) or (2), in which
the data processing unit
is configured to execute processing of analyzing a plurality of travel route candidates for the mobile object and selecting a safe travel route in which contact with an obstacle is avoided, and
selects a safe travel route by executing, for each one of the plurality of travel route candidates, a simulation of changing the flexible virtual bumper at least either in size or shape in such a way that no obstacle enters the flexible virtual bumper.

(4) The information processing apparatus according to (3), in which
the data processing unit selects a safe travel route by executing, for each one of a plurality of analysis points set on a route of the travel route candidate, the simulation of changing the flexible virtual bumper at least either in size or shape in such a way that no obstacle enters the flexible virtual bumper.

(5) The information processing apparatus according to (3) or (4), in which
the data processing unit generates a travel route candidate analysis list in which results of the simulation are recorded.

(6) The information processing apparatus according to any one of (3) to (5), in which
the data processing unit records, in a travel route candidate analysis list in which results of the simulation are recorded, bumper size transition data that includes a result of controlling the bumper size in a case of traveling each travel route candidate.

(7) The information processing apparatus according to any one of (3) to (6), in which
the data processing unit
executes valid/rejected determination processing in which,
as results of the simulation,
a travel route candidate that allows for a setting in which the flexible virtual bumper is changed in size or shape in such a way that no obstacle enters the flexible virtual bumper is set as a valid travel route candidate, and
a travel route candidate that does not allow for the setting in which the flexible virtual bumper is changed in size or shape in such a way that no obstacle enters the flexible virtual bumper is set as a rejected travel route candidate, and
records results of the valid/rejected determination processing in a travel route candidate analysis list in which the results of the simulation are recorded.

(8) The information processing apparatus according to any one of (3) to (7), in which
the data processing unit
selects only valid travel route candidates from a travel route candidate analysis list in which results of the simulation are recorded, and determines one travel route from the selected valid travel route candidates.

(9) The information processing apparatus according to (8), in which
the data processing unit
executes sorting processing in accordance with a predefined algorithm on the selected valid travel route candidates, and
determines one travel route on the basis of a sorting result.

(10) The information processing apparatus according to (9), in which
the sorting processing in accordance with the predefined algorithm in accordance with a priority is any one of following pieces of sorting processing (a) to (c):
(a) processing of sorting in descending order of average bumper size;
(b) processing of sorting in ascending order of average bumper size; or
(c) processing of sorting in ascending order of route travel distance.

(11) The information processing apparatus according to any one of (1) to (10), further including:
a sensor as obstacle detection means.

(12) The information processing apparatus according to any one of (1) to (11), in which
the mobile object is an automatic traveling robot, and
the data processing unit sets a flexible virtual bumper surrounding the automatic traveling robot.

(13) The information processing apparatus according to (12), in which
the data processing unit sets a flexible virtual bumper having a shape that is in contact with a charging contact position of the automatic traveling robot.

(14) The information processing apparatus according to any one of (1) to (13), in which
the data processing unit sets a flexible virtual bumper having a shape with a larger clearance on an obstacle side, the obstacle being of a higher priority of avoidance.

(15) The information processing apparatus according to any one of (1) to (11), in which
the mobile object is a load carrying vehicle, and
the data processing unit
sets a flexible virtual bumper surrounding the load carrying vehicle in a case where the load carrying vehicle is not carrying a load, and
sets a flexible virtual bumper surrounding the load carrying vehicle and the load in a case where the load carrying vehicle is carrying the load.

(16) The information processing apparatus according to any one of (1) to (11), in which
the mobile object is a hand-shaped robot that performs a grasping operation, and the data processing unit sets a flexible virtual bumper surrounding only an arm portion in such a way as to allow a fingertip of the hand-shaped robot to grip or touch an object.

(17) An information processing method to be executed by an information processing apparatus, the method including:
a bumper control step of executing, by a data processing unit, control to change a flexible virtual bumper for maintaining a space between a mobile object and an obstacle to be equal to or larger than a predetermined distance; and
a driving step of driving, by a drive unit, the mobile object in such a way that no obstacle enters the flexible virtual bumper,
in which the bumper control step includes the data processing unit executing control to change the flexible virtual bumper at least either in size or shape.

(18) A program for causing an information processing apparatus to execute information processing, the program causing:
a data processing unit to execute a bumper control step of controlling to change a flexible virtual bumper for maintaining a space between a mobile object and an obstacle to be equal to or larger than a predetermined distance; and
a drive unit to execute a driving step of driving the mobile object in such a way that no obstacle enters the flexible virtual bumper,
in which the bumper control step includes causing the data processing unit to execute control to change the flexible virtual bumper at least either in size or shape.

Note that the series of processing described in the specification can be executed by hardware, software, or a combination of both. In a case where the processing is executed by software, it is possible to install a program in which a processing sequence has been recorded on a memory in a computer built in dedicated hardware and execute the program, or it is possible to install a program on a general-purpose computer capable of executing various types of processing and execute the program. For example, the program can be recorded in a recording medium in advance. Besides being installed on a computer from a recording medium, the program can be received via a network such as a local area network (LAN) or the Internet and then installed on a recording medium such as a built-in hard disk.

Furthermore, the various types of processing described in the specification may be executed not only in time series in accordance with the description but also in parallel or individually as necessary or in accordance with a processing capability of the device that executes the processing. Furthermore, in the present specification, a system is a logical set configuration of a plurality of devices, and is not limited to one in which each configuration device is in the same housing.

INDUSTRIAL APPLICABILITY

As described above, according to the configuration of the embodiment of the present disclosure, a device and a method for performing control to change a flexible virtual bumper for maintaining a space between a mobile object and an obstacle to be equal to or larger than a predetermined distance are enabled.

Specifically, for example, a data processing unit that executes control to change the flexible virtual bumper for maintaining the space between the mobile object and the obstacle to be equal to or larger than the predetermined distance, and a drive unit that drives the mobile object in such a way that no obstacle enters the flexible virtual bumper are included. The data processing unit executes control to change the flexible virtual bumper at least either in size or shape. For each one of a plurality of travel route candidates for the mobile object, the data processing unit executes a simulation of changing the bumper size in such a way that no obstacle enters the flexible virtual bumper, and selects a safe travel route.

This configuration enables a device and a method for performing control to change a flexible virtual bumper for maintaining a space between a mobile object and an obstacle to be equal to or larger than a predetermined distance.

REFERENCE SIGNS LIST

10 Automatic traveling robot
11 Virtual bumper
20 Travel route candidate
30 Obstacle
100 Automatic traveling robot
111 Flexible virtual bumper
120 Charging contact
130 Pedestrian
131 Guardrail
200 Information processing apparatus
201 Control unit (data processing unit)
202 Input unit
203 Output unit
204 Sensor group (camera, radar, and the like)
205 Drive unit
206 Communication unit
207 Storage unit
221 Vehicle speed detection unit
222 Travel route candidate generation unit
223 Obstacle position analysis unit
224 Flexible virtual bumper generation unit
225 Travel route determination unit
250 Flexible virtual bumper
260 Processing target travel route candidate
261 Analysis point
271, 272 Flexible virtual bumper
301 CPU
302 ROM
303 RAM
304 Bus
305 Input/output interface
306 Input unit
307 Output unit
308 Storage unit
309 Communication unit
310 Drive
311 Removable medium

The invention claimed is:
1. An information processing apparatus, comprising:
one or more processors configured to:
analyze a plurality of travel route candidates for a mobile object, wherein the mobile object is associated with a flexible virtual bumper;
execute, for each of the plurality of travel route candidates, a simulation that changes the flexible virtual bumper in at least one of a shape or a size to avoid entry of a first obstacle in the flexible virtual bumper;
select, based on the executed simulation, a safe travel route from the plurality of travel route candidates, wherein the safe travel route avoids contact of the flexible virtual bumper with the first obstacle;

change, based on the selected safe travel route, the
flexible virtual bumper to maintain a space between
the mobile object and the first obstacle, wherein the
space is equal to or larger than a distance; and
drive the mobile object on the selected safe travel route
with the changed flexible virtual bumper.

2. The information processing apparatus according to claim 1, wherein
the size of the flexible virtual bumper is larger than an allowable size, and
the allowable size corresponds to a size of the mobile object.

3. The information processing apparatus according to claim 1, wherein the one or more processors are further configured to:
execute, for each one of a plurality of analysis points set on a route of the plurality of travel route candidates, the simulation; and
select, based on the executed simulation for each one of the plurality of analysis points, the safe travel route.

4. The information processing apparatus according to claim 1, wherein the one or more processors are further configured to generate a travel route candidate analysis list that records a result of the execution of the simulation.

5. The information processing apparatus according to claim 4, wherein the one or more processors are further configured to record, in the travel route candidate analysis list, bumper size transition data, wherein the bumper size transition data includes a result of the change in the at least one of the size or the shape of the flexible virtual bumper to travel on each of the plurality of travel route candidates.

6. The information processing apparatus according to claim 1, wherein
the one or more processors are further configured to execute valid/rejected determination process on the plurality of travel route candidates, and wherein
a first one or more travel route candidates of the plurality of travel route candidates, that allows for a setting where the flexible virtual bumper is changed in the at least one of the size or the shape
to avoid the entry of the first obstacle in the flexible virtual bumper, are set as one or more valid travel route candidates, and
a second one or more travel route candidates of the plurality of travel route candidates, that prevents the setting where the flexible virtual bumper is changed in the at least one of the size or the shape to avoid the entry of the first obstacle in the flexible virtual bumper, are set as one or more rejected travel route candidates, and
record a result of the execution of the valid/rejected determination process in a travel route candidate analysis list.

7. The information processing apparatus according to claim 6, wherein the one or more processors are further configured to:
select the one or more valid travel route candidates from the travel route candidate analysis list; and
determine the safe travel route from the selected one or more valid travel route candidates.

8. The information processing apparatus according to claim 7, wherein the one or more processors are further configured to:
execute a sorting process, based on a priority order, on the selected one or more valid travel route candidates; and
determine the safe travel route based on the execution of sorting process.

9. The information processing apparatus according to claim 8, wherein the selected one or more valid travel route candidates are sorted in one of:
(a) a descending order of an average bumper size,
(b) an ascending order of the average bumper size, or
(c) an ascending order of a route travel distance.

10. The information processing apparatus according to claim 1, further comprising a sensor configured to detect the first obstacle.

11. The information processing apparatus according to claim 1, wherein
the mobile object is an automatic traveling robot, and
the flexible virtual bumper surrounds the automatic traveling robot.

12. The information processing apparatus according to claim 11, wherein
the automatic traveling robot includes a charging contact, and
the one or more processors are further configured to set the flexible virtual bumper in a planar position of a position of the charging contact.

13. The information processing apparatus according to claim 1, wherein
the one or more processors are further configured to set the shape of the flexible virtual bumper with a clearance on a side of the first obstacle larger than a clearance on a side of a second obstacle, and
the first obstacle is of a higher priority of avoidance compared to the second obstacle.

14. The information processing apparatus according to claim 1, wherein
the mobile object is a load carrying vehicle, and
the one or more processors are further configured to:
set the flexible virtual bumper to surround the load carrying vehicle in a case where the load carrying vehicle is empty; and
set the flexible virtual bumper to surround the load carrying vehicle and a load in a case where the load carrying vehicle carries the load.

15. The information processing apparatus according to claim 1, wherein
the mobile object is a hand-shaped robot configured to perform a grasping operation,
the one or more processors are further configured to set the flexible virtual bumper to surround an arm portion of the hand-shaped robot, and
the flexible virtual bumper is set to allow a fingertip of the hand-shaped robot to grip or touch an object.

16. An information processing method, comprising:
analyzing a plurality of travel route candidates for a mobile object, wherein the mobile object is associated with a flexible virtual bumper;
executing, for each of the plurality of travel route candidates, a simulation that changes the flexible virtual bumper in at least one of a shape or a size to avoid entry of a first obstacle in the flexible virtual bumper;
selecting, based on the executed simulation, a safe travel route from the plurality of travel route candidates, wherein the safe travel route avoids contact of the flexible virtual bumper with the first obstacle;
changing, based on the execution of the selected safe travel route, the flexible virtual bumper for maintaining a space between the mobile object and an obstacle, wherein the space is equal to or larger than a distance; and
driving the mobile object on the selected safe travel route with the changed flexible virtual bumper.

17. A non-transitory computer-readable medium, having stored thereon, computer-executable instructions that, when executed by an information processing apparatus, causes the information processing apparatus to execute operations, the operations comprising:
- analyzing a plurality of travel route candidates for a mobile object, wherein the mobile object is associated with a flexible virtual bumper;
- executing, for each of the plurality of travel route candidates, a simulation that changes the flexible virtual bumper in at least one of a shape or a size to avoid entry of a first obstacle in the flexible virtual bumper;
- selecting, based on the executed simulation, a safe travel route from the plurality of travel route candidates, wherein the safe travel route avoids contact of the flexible virtual bumper with the first obstacle;
- changing, based on the execution of the selected safe travel route, the flexible virtual bumper for maintaining a space between the mobile object and an obstacle, wherein the space is equal to or larger than a distance; and
- on the selected safe travel route with the changed flexible virtual bumper.

* * * * *